(12) United States Patent
Morito et al.

(10) Patent No.: US 9,984,826 B2
(45) Date of Patent: May 29, 2018

(54) LAMINATED CAPACITOR

(71) Applicant: Murata Manufacturing Co., Ltd., Nagaokakyo-shi, Kyoto-fu (JP)

(72) Inventors: Kaori Morito, Nagaokakyo (JP); Takanobu Katsuyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 68 days.

(21) Appl. No.: 15/275,631

(22) Filed: Sep. 26, 2016

(65) Prior Publication Data
US 2017/0092424 A1 Mar. 30, 2017

(30) Foreign Application Priority Data
Sep. 30, 2015 (JP) .................. 2015-194078

(51) Int. Cl.
| | |
|---|---|
| *H01G 4/30* | (2006.01) |
| *H01G 4/228* | (2006.01) |
| *H01G 4/224* | (2006.01) |
| *H01G 4/005* | (2006.01) |
| *H01G 4/018* | (2006.01) |

(52) U.S. Cl.
CPC .............. *H01G 4/30* (2013.01); *H01G 4/005* (2013.01); *H01G 4/018* (2013.01); *H01G 4/224* (2013.01); *H01G 4/228* (2013.01)

(58) Field of Classification Search
None
See application file for complete search history.

(56) References Cited

U.S. PATENT DOCUMENTS

| | | | | |
|---|---|---|---|---|
| 6,377,439 | B1 * | 4/2002 | Sekidou ................ | H01G 4/005 361/303 |
| 8,335,072 | B1 * | 12/2012 | Kim ........................ | H01G 4/30 361/303 |
| 8,351,181 | B1 * | 1/2013 | Ahn ........................ | H01G 4/30 361/306.1 |
| 9,093,220 | B1 * | 7/2015 | Kitano .................... | H01G 4/12 |
| 2013/0056252 | A1 | 3/2013 | Fujii et al. | |
| 2013/0319741 | A1 * | 12/2013 | Ahn ........................ | H01G 4/30 174/260 |
| 2014/0166351 | A1 * | 6/2014 | Lee ......................... | H01G 2/06 174/258 |
| 2015/0116898 | A1 * | 4/2015 | Takashima ............. | H01G 4/012 361/301.4 |
| 2016/0049244 | A1 * | 2/2016 | Kitano ................... | H01G 4/1209 361/301.4 |

(Continued)

FOREIGN PATENT DOCUMENTS
JP 2013-065820 A 4/2013

*Primary Examiner* — Dion R Ferguson
(74) *Attorney, Agent, or Firm* — Keating & Bennett, LLP

(57) ABSTRACT

A laminated capacitor includes a multilayer body and first and second outer electrodes on a portion of a surface of the multilayer body. Relationships GT1>GL>GW, GT2>GL>GW, SL>SW, and (SL/SW)>(ML/MW) are satisfied, where a thickness of a first outer layer portion is GT1, a thickness of a second outer layer portion is GT2, a width of a side portion is GW, each length of end portions is GL, a length of the multilayer body is SL, a width of the multilayer body is SW, a length of a main portion is ML, and a width of the main portion is MW.

28 Claims, 18 Drawing Sheets

(56) References Cited

U.S. PATENT DOCUMENTS

| | | | |
|---|---|---|---|
| 2016/0049245 A1* | 2/2016 | Kitano | H01G 4/30 361/301.4 |
| 2016/0049246 A1* | 2/2016 | Kitano | H01G 4/30 361/301.4 |
| 2016/0049247 A1* | 2/2016 | Kitano | H01G 4/30 361/301.4 |
| 2016/0049256 A1* | 2/2016 | Kitano | H01G 4/30 361/301.4 |

* cited by examiner

LAMINATED CAPACITOR

CROSS REFERENCE TO RELATED APPLICATIONS

This application claims the benefit of priority to Japanese Patent Application 2015-194078 filed Sep. 30, 2015. The entire contents of this application is hereby incorporated herein by reference.

BACKGROUND OF THE INVENTION

1. Field of the Invention

The present invention relates to laminated capacitors.

2. Description of the Related Art

Japanese Unexamined Patent Application Publication No. 2013-65820 discloses the structure of a laminated capacitor according to the related art. In the laminated capacitor disclosed in Japanese Unexamined Patent Application Publication No. 2013-65820, noise referred to as "acoustic noise" is reduced by increasing a distance from the mounting surface to a capacitor conductor which is nearest to the mounting surface.

The acoustic noise is generated by a laminated capacitor being mechanically strained due to an electric field induced strain of a dielectric layer when a voltage is applied to the laminated capacitor. In the laminated capacitor disclosed in Japanese Unexamined Patent Application Publication No. 2013-65820, although increasing a distance from the mounting surface to a capacitor conductor which is nearest to the mounting surface reduces the acoustic noise, there is room for more reduction in the acoustic noise.

SUMMARY OF THE INVENTION

Preferred embodiments of the present invention provide a laminated capacitor that effectively reduces acoustic noise.

The inventors of preferred embodiments of the present invention diligently conducted research and discovered that the magnitude of acoustic noise varies depending on the strain balance in the laminated capacitor. More specifically, it was discovered that acoustic noise could be effectively reduced by reducing a deviation in strain inside a multilayer body of the laminated capacitor. As such, a laminated capacitor according to each preferred embodiment of the present invention is designed and configured as described herein in order to reduce a deviation in strain inside the multilayer body of the laminated capacitor.

A laminated capacitor according to a first preferred embodiment of the present invention includes a multilayer body having a rectangular or substantially rectangular parallelepiped shape, and including a plurality of dielectric layers and a plurality of conductor layers that are laminated, a first main surface and a second main surface opposing each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and a first outer electrode and a second outer electrode provided on a portion of a surface of the multilayer body. The plurality of conductor layers include a first conductor layer connected to the first outer electrode and a second conductor layer connected to the second outer electrode. The multilayer body includes a main portion in which opposing portions of the first conductor layer and the second conductor layer that oppose each other are laminated, a first outer layer portion between the first main surface and the main portion, a second outer layer portion between the second main surface and the main portion, a side portion between the side surface and the main portion, and an end portion between the end surface and the main portion. The laminated capacitor satisfies the following relationships where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW: GT1>GL>GW, GT2>GL>GW, SL>SW, and (SL/SW) >(ML/MW).

A laminated capacitor according to a second preferred embodiment of the present invention includes a multilayer body having a rectangular or substantially rectangular parallelepiped shape, and including a plurality of dielectric layers and a plurality of conductor layers that are laminated, a first main surface and a second main surface opposing each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and a first outer electrode and a second outer electrode provided on a portion of a surface of the multilayer body. The plurality of conductor layers include a first conductor layer connected to the first outer electrode and a second conductor layer connected to the second outer electrode. The multilayer body includes a main portion in which opposing portions of the first conductor layer and the second conductor layer that oppose each other are laminated, a first outer layer portion between the first main surface and the main portion, a second outer layer portion between the second main surface and the main portion, a side portion between the side surface and the main portion, and an end portion between the end surface and the main portion. The laminated capacitor satisfies the relationships GT2>GT1, GT2>GL>GW, SL>SW, and (SL/SW)>(ML/MW), where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

A laminated capacitor according to a third preferred embodiment of the present invention includes a multilayer body having a rectangular or a substantially rectangular parallelepiped shape, and including a plurality of dielectric layers and a plurality of conductor layers that are laminated, a first main surface and a second main surface opposing each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and a first outer electrode and a second outer electrode provided on a portion of a surface of the multilayer body. The plurality of conductor layers include a first conductor layer connected to the first outer electrode and a second conductor layer connected to the second outer electrode. The multilayer body includes a main portion where the greatest number of opposing portions of the first conductor layer and the second conductor layer that oppose each other are laminated, a first outer layer portion between the main portion and the first main surface, a second outer layer portion between the main portion and the second main surface and includes at least one of opposing portions of the first conductor layer and the second conductor layer that oppose each other, a side portion between the side surface and the main portion, and an end portion between the end surface and the main portion. The shortest distance from the opposing portion within the second outer layer portion to the opposing portion within the main portion is greater than an average thickness of the dielectric layer in the main portion. The laminated capacitor satisfies the relationships GT1>GL>GW, GT2>GL>GW, SL>SW, and (SL/SW)>(ML/MW), where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

A laminated capacitor according to a fourth preferred embodiment of the present invention includes a multilayer body having a rectangular or a substantially rectangular parallelepiped shape, and including a plurality of dielectric layers and a plurality of conductor layers that are laminated, a first main surface and a second main surface opposing each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and a first outer electrode and a second outer electrode provided on a portion of a surface of the multilayer body. The plurality of conductor layers include a first conductor layer connected to the first outer electrode and a second conductor layer connected to the second outer electrode. The multilayer body includes a main portion where the greatest number of opposing portions of the first conductor layer and the second conductor layer that oppose each other are laminated, a first outer layer portion between the main portion and the first main surface, a second outer layer portion between the main portion and the second main surface and including at least one of opposing portions of the first conductor layer and the second conductor layer that oppose each other, a side portion between the side surface and the main portion, and an end portion between the end surface and the main portion. The shortest distance from the opposing portion within the second outer layer portion to the opposing portion within the main portion is greater than an average thickness of the dielectric layer in the main portion. The laminated capacitor satisfies the relationships GT2>GT1, GT2>GL>GW, SL>SW, and (SL/SW)>(ML/MW), where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

In a preferred embodiment of the present invention, the laminated capacitor preferably satisfies a relationship of 2>(SL/SW)>(ML/MW)>1.5, for example.

In a preferred embodiment of the present invention, the second outer layer portion includes an inner side portion layer adjacent to the main portion, and an outer side portion layer that is adjacent to the inner side portion layer and defines the second main surface. The material composition of the outer side portion layer is different from that of the inner side portion layer.

In a preferred embodiment of the present invention, at least each of the two outer electrodes includes a base portion directly covering a surface of the multilayer body, and a cover portion which covers the base portion. The base portion includes a material including a ceramic component and a Ni component. The cover portion includes a plating film. Each of the plurality of conductor layers includes a material including a Ni component.

In a preferred embodiment of the present invention, the Ni component of each of the plurality of conductor layers and the Ni component of the base portion are integrated with each other in a connecting portion between each of the plurality of conductor layers and the base portion.

In a preferred embodiment of the present invention, a distance between two ends of the plurality of conductor layers that are spaced the farthest distance from each other in the width direction is shorter than a distance between two ends of the plurality of conductor layers that are spaced the farthest distance from each other in the lengthwise direction.

In a preferred embodiment of the present invention, the side surfaces include a first side surface and a second side surface that oppose each other in the width direction. The end surfaces include a first end surface and a second end surface that oppose each other in the lengthwise direction. The side portions include a first side portion between the first side surface and the main portion, and a second side portion between the second side surface and the main portion. The end portions include a first end portion between the first end surface and the main portion, and a second end portion between the second end surface and the main portion. "GW" is a width of the first side portion or a width of the second side portion. "GL" is a length of the first end portion or a length of the second end portion.

According to the various preferred embodiments of the present invention, acoustic noise is effectively reduced.

The above and other elements, features, steps, characteristics and advantages of the present invention will become more apparent from the following detailed description of the preferred embodiments of the present invention with reference to the attached drawings.

DESCRIPTION OF THE PREFERRED EMBODIMENTS

Figure 1:
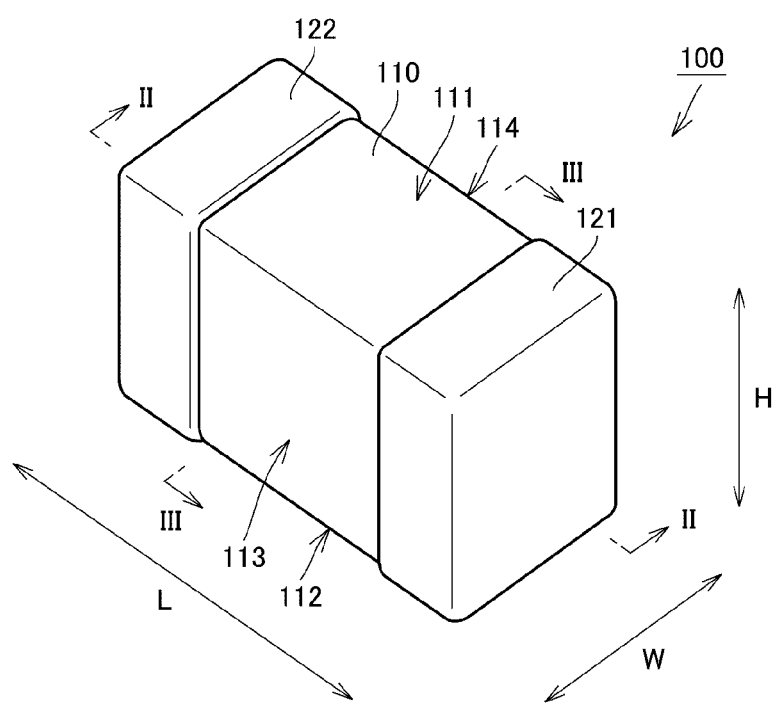
FIG. 1 is a perspective view illustrating an external appearance of a laminated capacitor according to a first preferred embodiment of the present invention.

Hereinafter, laminated capacitors according to preferred embodiments of the present invention will be described with reference to the drawings. In the following description of the preferred embodiments, the same or corresponding elements are assigned the same reference signs in the drawings and descriptions thereof will not be repeated.

First Preferred Embodiment

Figure 2:
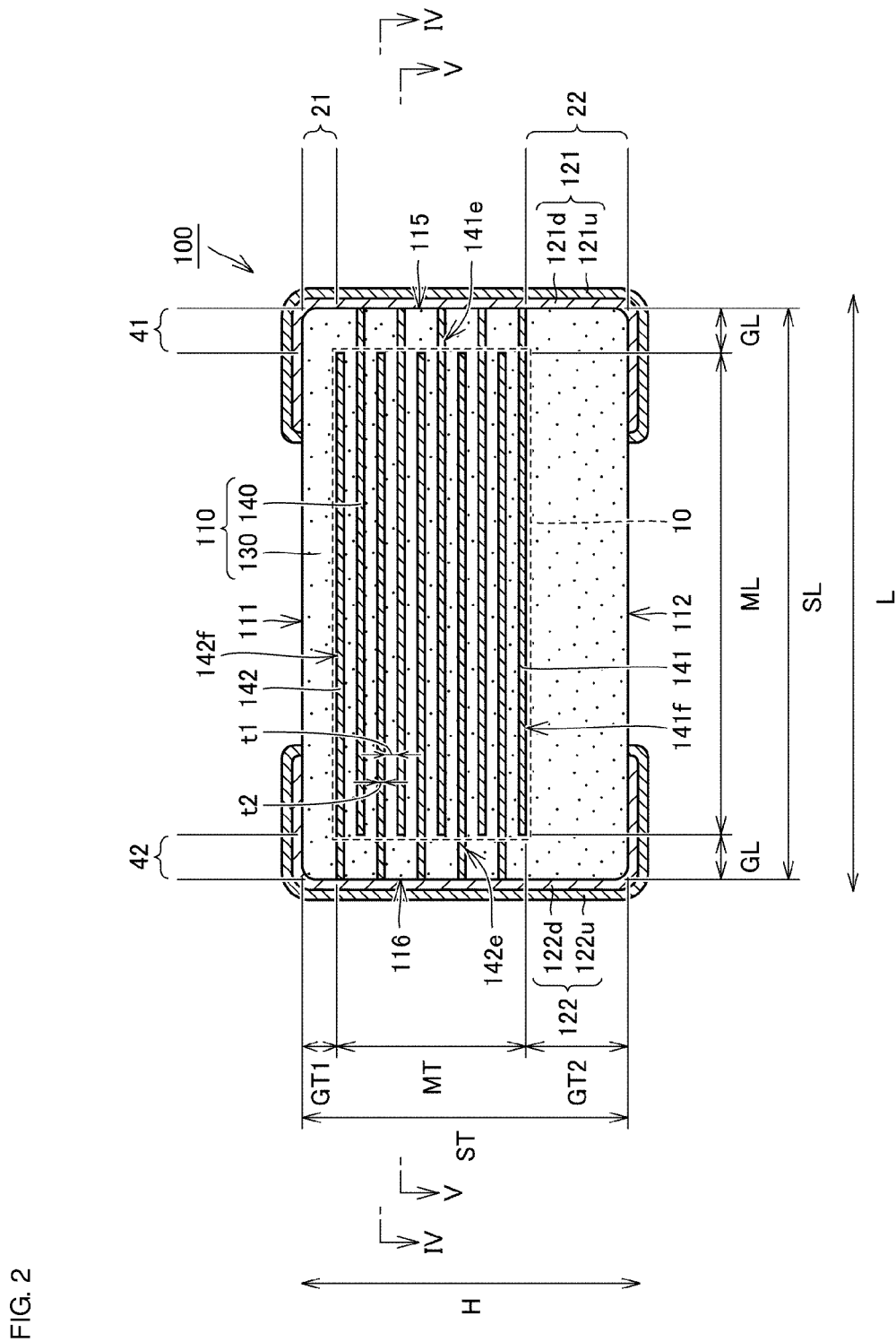
FIG. 2 is a cross-sectional view of the laminated capacitor shown in FIG. 1 when cut along a line II-II.
Figure 3:
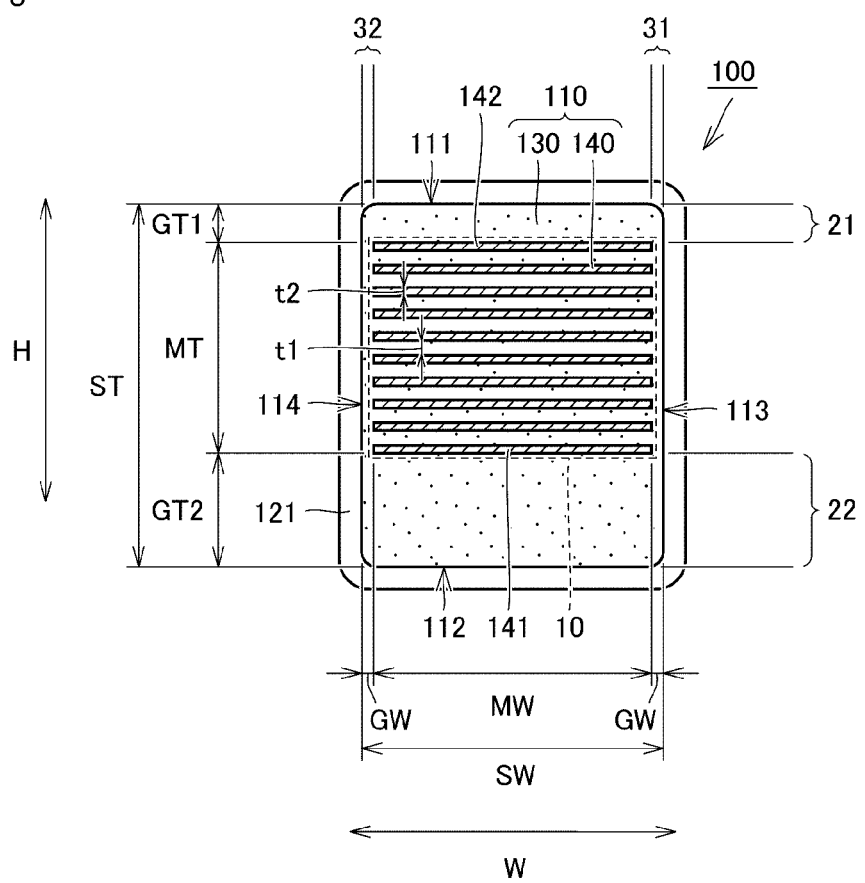
FIG. 3 is a cross-sectional view of the laminated capacitor shown in FIG. 1 when cut along a line III-III.
Figure 4:
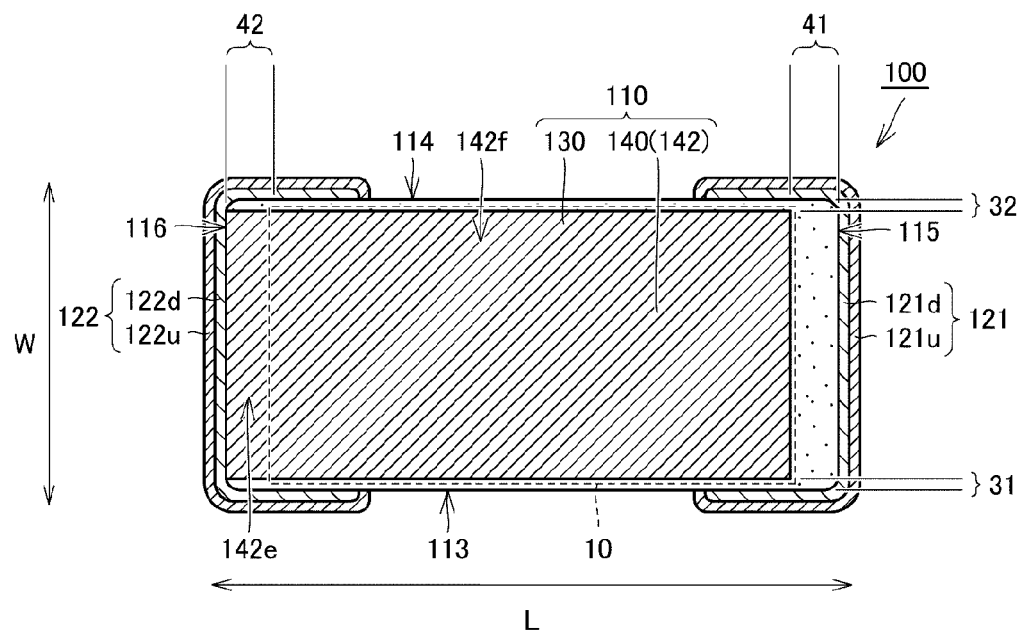
FIG. 4 is a cross-sectional view of the laminated capacitor shown in FIG. 2 when cut along a line IV-IV.
Figure 5:
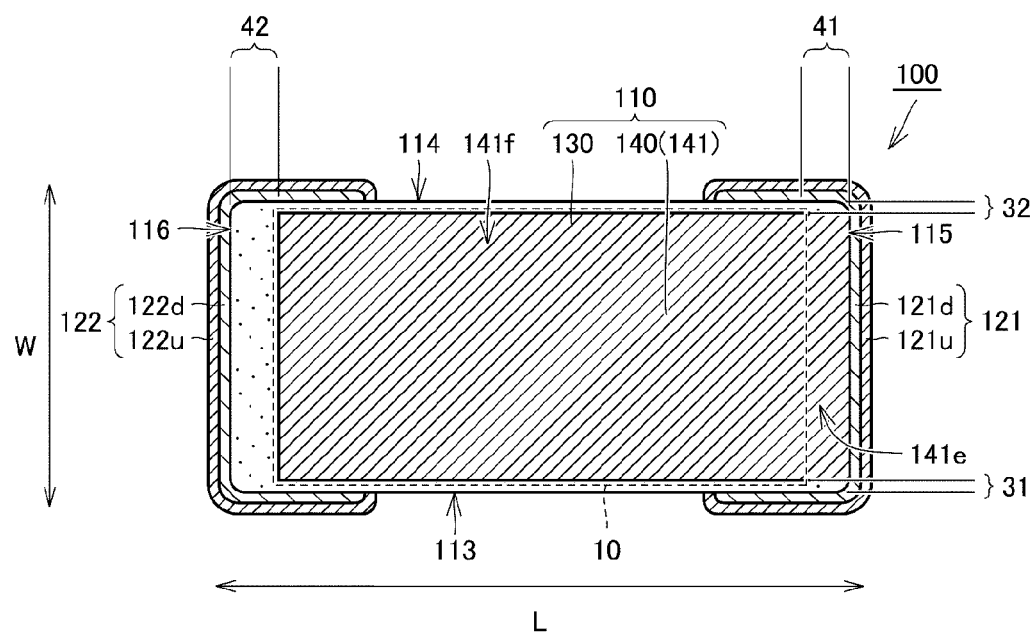
FIG. 5 is a cross-sectional view of the laminated capacitor shown in FIG. 2 when cut along a line V-V.

FIG. 1 is a perspective view illustrating an external appearance of a laminated capacitor according to a first preferred embodiment of the present invention. FIG. 2 is a cross-sectional view of the laminated capacitor shown in FIG. 1 when cut along a line II-II. FIG. 3 is a cross-sectional view of the laminated capacitor shown in FIG. 1 when cut along a line III-III. FIG. 4 is a cross-sectional view of the laminated capacitor shown in FIG. 2 when cut along a line IV-IV. FIG. 5 is a cross-sectional view of the laminated capacitor shown in FIG. 2 when cut along a line V-V. In FIGS. 1 to 5, a lengthwise direction of a multilayer body to be explained later is indicated as "L", a width direction of the multilayer body is indicated as "W", and a height direction of the multilayer body is indicated as "H".

As shown in FIGS. 1 to 5, a laminated capacitor 100 according to the first preferred embodiment of the present invention includes a multilayer body 110 and two outer electrodes provided on a portion of a surface of the multilayer body 110. The multilayer body 110 includes a plurality of dielectric layers 130 and a plurality of conductor layers 140 that are laminated. In the present preferred embodiment, the dielectric layers 130 and the conductor layers 140 are alternately laminated. The multilayer body 110 preferably has a rectangular or substantially rectangular parallelepiped shape, for example. A lamination direction of the dielectric layers 130 and the conductor layers 140 is perpendicular or substantially perpendicular to the lengthwise direction L of the multilayer body 110 and the width direction W of the multilayer body 110. In other words, the lamination direction of the dielectric layers 130 and the conductor layers 140 is parallel or substantially parallel to the height direction H of the multilayer body 110.

The multilayer body 110 includes a first main surface 111 and a second main surface 112 that are opposed to each other in the lamination direction of the multilayer body 110, two side surfaces connecting the first main surface 111 and the second main surface 112 and that are opposed to each other in the width direction W of the rectangular or substantially rectangular parallelepiped shape, and two end surfaces connecting the first main surface 111 and the second main surface 112 and that are opposed to each other in the lengthwise direction L of the rectangular or substantially rectangular parallelepiped shape. One of the two side surfaces is a first side surface 113 and the other thereof is a second side surface 114. One of the two end surfaces is a first end surface 115 and the other thereof is a second end surface 116.

Preferably, the shortest distance between the first side surface 113 and the second side surface 114 is less than the shortest distance between the first end surface 115 and the second end surface 116. In other words, a width SW of the multilayer body 110 is less than a length SL of the multilayer body 110. The multilayer body 110 preferably satisfies a relation of SL>SW, for example. Although the multilayer body 110 has a rectangular or substantially rectangular parallelepiped shape, at least corner potions or ridge line portions thereof may be rounded. Moreover, unevenness may be provided on a surface of the multilayer body 110.

The plurality of conductor layers 140 include first conductor layers 141 and second conductor layers 142 that are alternately positioned in the lamination direction of the multilayer body 110 and also shifted from each other in the lengthwise direction L of the multilayer body 110.

The first conductor layers 141 are connected to a first outer electrode 121, which is one of the two outer electrodes, on the first end surface 115, which is one of the two end surfaces. The second conductor layers 142 are connected to a second outer electrode 122, which is the other of the two outer electrodes, on the second end surface 116, which is the other of the two end surfaces.

The first conductor layer 141 preferably has a rectangular or substantially rectangular shape, for example, when viewed in the lamination direction of the multilayer body 110, and includes an opposing portion 141f that opposes the second conductor layer 142 and an extended portion 141e that is extended from the opposing portion 141f toward the first end surface 115. The second conductor layer 142 preferably has a rectangular or substantially rectangular shape when viewed in the lamination direction of the multilayer body 110, and includes an opposing portion 142f that opposes the first conductor layer 141 and an extended portion 142e that is extended from the opposing portion 142f toward the second end surface 116. However, note that the configuration and arrangement of the first conductor layer 141 and the second conductor layer 142 are not limited to the above-described positions, and the conductor layers may be provided so as to be electrically connected to respective two outer electrodes, which will be explained later. For example, the extended portion 141e of the first conductor layer 141 may extend from the opposing portion 141f toward the first side surface. The extended portion 142e of the second conductor layer 142 may extend from the opposing portion 142f toward the second end surface 116.

The two outer electrodes are respectively provided on both sides of the multilayer body 110 in the lengthwise direction L. Specifically, the first outer electrode 121 is provided on the first end surface 115 side of the multilayer body 110, while the second outer electrode 122 is provided on the second end surface 116 side. In the present preferred embodiment, the first outer electrode 121 preferably extends from the first end surface 115 to respective portions of the first main surface 111, the second main surface 112, the first side surface 113, and the second side surface 114. The second outer electrode 122 preferably extends from the second end surface 116 to respective portions of the first main surface 111, the second main surface 112, the first side surface 113, and the second side surface 114. However, note that the configuration and arrangement of the two outer electrodes are not limited to the above-described positions, and the outer electrodes may be provided on a portion of the surface of the multilayer body 110 so that they are electrically connected to the plurality of conductor layers 140 and the laminated capacitor 100 can be mounted.

The multilayer body 110 includes a main portion 10, a first outer layer portion 21, a second outer layer portion 22, two side portions, and two end portions. The main portion 10 is a region in which the opposing portions 141f of the first conductor layers 141 and the opposing portions 142f of the second conductor layers 142 are laminated. The first outer layer portion 21 includes the dielectric layer 130, among the plurality of dielectric layers 130, that is adjacent to the main portion 10 in the lamination direction of the multilayer body 110 and defines the first main surface 111. The second outer layer portion 22 includes a dielectric layer, among the plurality of dielectric layers 130, that is adjacent to the main portion 10 in the lamination direction of the multilayer body 110 and defines the second main surface 112.

One of the two side portions is a first side portion 31 and the other thereof is a second side portion 32. The first side portion 31 is between the first side surface 113 and the main portion 10. The second side portion 32 is between the second side surface 114 and the main portion 10.

One of the two end portions is a first end portion 41 and the other thereof is a second end portion 42. The first end portion 41 is between the first end surface 115 and the main portion 10. The second end portion 42 is between the second end surface 116 and the main portion 10.

In the laminated capacitor 100, the relationships GT2>GT1, GT2>GL>GW, SL>SW, and (SL/SW)>(ML/MW) are satisfied, where a thickness of the first outer layer portion 21 is GT1, a thickness of the second outer layer portion 22 is GT2, widths of the first side portion 31 and the second side portion 32 are each GW, lengths of the first end portion 41 and the second end portion 42 are each GL, a length of the multilayer body 110 is SL, a width of the multilayer body 110 is SW, a length of the main portion 10 is ML, and a width of the main portion 10 is MW.

Hereinafter, configurations of the laminated capacitor 100 according to a preferred embodiment of the present invention will be described in detail.

An average thickness t1 of each of the plurality of dielectric layers 130 is preferably no less than approximately 0.3 μm and no more than approximately 4 μm, for example, after calcination. As a material for the dielectric layer 130, dielectric ceramics whose main component is $BaTiO_3$, $CaTiO_3$, $SrTiO_3$, $CaZrO_3$, or other suitable dielectric ceramics, for example, are preferably used. Further, a material including Mn, Mg, Si, Co, Ni, a rare earth element, or other suitable material, for example, may preferably be added as an accessory component to the main component.

An average thickness t2 of each of the plurality of conductor layers 140 is preferably no less than approximately 0.2 μm and no more than approximately 2.0 μm, for example, after calcination. As a material for the conductor layer 140, a metal such as Ni, Cu, Ag, Pd, or Au, or an alloy containing at least one of these metals, for example, an alloy of Ag and Pd may preferably be used. In the present preferred embodiment, the conductor layer 140 is preferably made of a material containing a Ni component.

The first outer electrode 121 and the second outer electrode 122 include base portions 121d and 122d directly covering the surface of the multilayer body 110, and cover portions 121u and 122u covering the base portions 121d and 122d, respectively. The base portions 121d and 122d are each preferably made of a material including at least one of a glass component and a ceramic component and a metal component, for example. The base portions 121d and 122d preferably include at least one type of metal component such as Ni, Cu, Ag, Pd, Au, or other suitable metal component, for example. In the present preferred embodiment, the base portions 121d and 122d each preferably include a ceramic component and a Ni component, for example.

The cover portions 121u and 122u are made of a plating film. The cover portions 121u and 122u preferably include at least one type of metal component such as Ni, Cu, Ag, Pd, Au, Sn, Pt, Bi, Zn, or other suitable metal component, for example. The cover portions 121u and 122u may be made of a laminated film. In this case, it is preferable for the cover portions 121u and 122u to be made of a plating film including a Ni component and another plating film including a Sn component and provided on the plating film including a Ni component. The plating film including a Ni component functions as a solder barrier. The plating film including a Sn component functions to improve wettability with solder.

In the present preferred embodiment in which a Ni component is included in the base portions 121d and 122d, it is preferable that a plating film including a Cu component which has a function to reduce or prevent penetration of hydrogen into the multilayer body 110 be provided between the base portions 121d, 122d and the plating film including a Ni component. It is preferable for an average thickness of each plating film to be no less than approximately 1.0 μm and no more than approximately 15.0 μm, for example. Where the base portions 121d and 122d include a glass component and a Cu component, it is preferable that the cover portions 121u and 122u be made of a plating film including a Ni component provided on the base portions 121d and 122d, and another plating film including a Sn component and provided on the plating film including a Ni component.

In a connecting portion between each of the plurality of first conductor layers 141 and the base portion 121d of the first outer electrode 121, the Ni component of each of the plurality of first conductor layers 141 and the Ni component of the base portion 121d of the first outer electrode 121 are integrated with each other. In a connecting portion between each of the plurality of second conductor layers 142 and the base portion 122d of the second outer electrode 122, the Ni component of each of the plurality of second conductor layers 142 and the Ni component of the base portion 122d of the second outer electrode 122 are integrated with each other.

Hereinafter, a non-limiting example of a manufacturing method for the laminated capacitor 100 according to the present preferred embodiment will be described.

Figure 6:
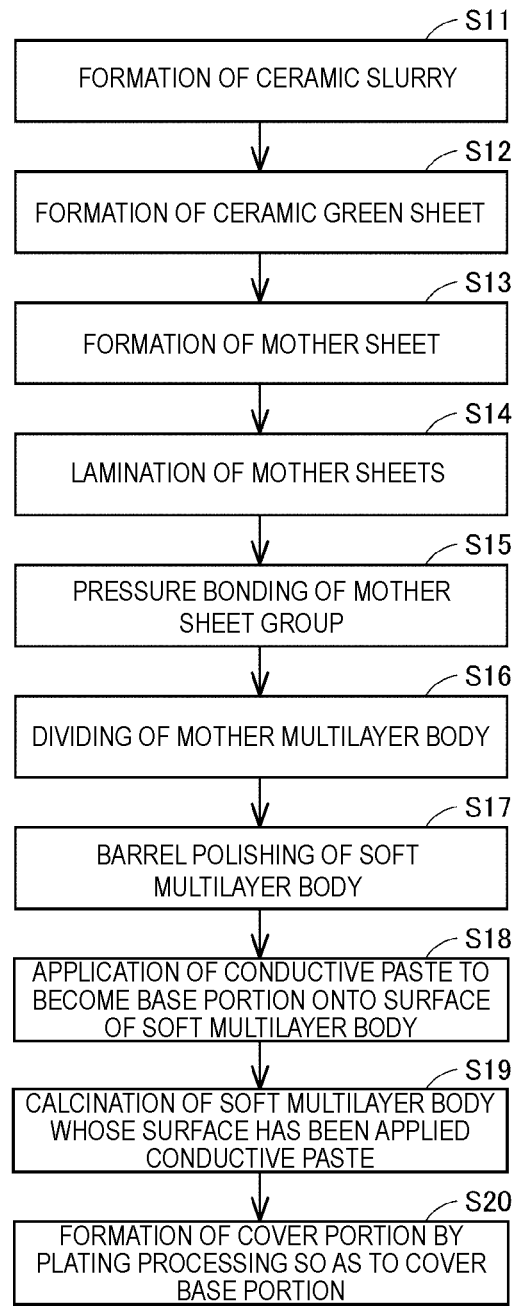
FIG. 6 is a flowchart illustrating a manufacturing method for the laminated capacitor according to the first preferred embodiment of the present invention.

FIG. 6 is a flowchart illustrating a manufacturing method for the laminated capacitor 100 according to the first preferred embodiment of the present invention. Note that the manufacturing method for the laminated capacitor described below is a manufacturing method in which a set of process steps from start to a midway stage in the whole manufacturing process are consecutively performed so as to produce a mother multilayer body, thereafter, the mother multilayer body is divided into individual entities, and additional process steps are performed on soft multilayer bodies that are separated into individual multilayer bodies so as to mass-produce a plurality of laminated capacitors 100 at the same time.

As shown in FIG. 6, ceramic slurry is prepared first (step S11). To be specific, ceramics powder, a binder, a solvent, and other suitable ingredients are mixed at a predetermined blending ratio, thus forming the ceramic slurry.

Ceramic green sheets are formed next (step S12). More specifically, the ceramic slurry is molded into a sheet shape on a carrier film using a die coater, a gravure coater, a micro gravure coater, or other coater so as to form the ceramic green sheets.

Subsequently, mother sheets are formed (step S13). More specifically, the mother sheets in which a predetermined conductive pattern is provided on each of the ceramic green sheets are formed by applying a conductive paste onto the ceramic green sheets through screen printing, gravure printing, or other suitable method so that the applied conductive paste forms the predetermined pattern. In the present preferred embodiment, the above-mentioned conductive paste preferably contains a Ni component.

As a mother sheet, in addition to the mother sheet including the conductive pattern, a ceramic green sheet on which the step S13 has not been performed is also prepared.

Next, the mother sheets are laminated (step S14). A predetermine number of mother sheets with no conductive pattern formed thereon are laminated to form the first outer layer portion 21, a plurality of mother sheets with the conductive pattern formed thereon are laminated in sequence to form the main portion 10 on the laminated mother sheets forming the first outer layer portion 21, and then a predetermined number of mother sheets with no conductive pattern formed thereon are laminated to form the second outer layer portion 22 on the laminated mother sheets forming the main potion 10, such that a group of mother sheets are provided.

Subsequently, the group of mother sheets are pressure-bonded (step S15). That is, the group of mother sheets are pressurized to be pressure-bonded along the lamination direction by isostatic pressing or rigid-body pressing, such that a mother multilayer body is formed.

Next, the mother multilayer body is divided (step S16). More specifically, the mother multilayer body is divided in a matrix by being cut with a press-cutter or a dicing machine, for example, and separated into a plurality of individual soft multilayer bodies.

Subsequently, the soft multilayer bodies are barrel polished (step S17). More specifically, the soft multilayer bodies are sealed, together with media balls having a higher degree of hardness than ceramic materials, in a small box called a barrel, and then the barrel is rotated, such that outer surfaces (in particular, corner portions and ridge line portions) of the soft multilayer bodies are each rounded so as to have a curved shape.

Next, a conductive paste is applied onto the surface of the soft multilayer body so as to form the base portions (step S18). More specifically, a conductive paste that will become the base portions of the outer electrodes is applied to both end portions of the soft multilayer body by various kinds of printing methods, a dip method, or other suitable methods. This conductive paste includes an organic solvent, metal particles, and a resin. The metal particles preferably include a Ni component in the present preferred embodiment.

Subsequently, the soft multilayer body onto the surface of which the conductive paste has been applied is calcined (step S19). More specifically, the soft multilayer body onto the surface of which the conductive paste has been applied is heated to a predetermined temperature, such that a ceramic dielectric material and a conductor material are calcined. The calcination temperature is appropriately set in accordance with types of the ceramic dielectric material and the conductor material; for example, it is preferably set within a range of no less than approximately 900° C. and no more than approximately 1300° C. Because the conductor material that becomes the conductor layer and the conductive paste that becomes the base portion are calcined at the same time, the Ni component of the conductor layer and the Ni component of the base portion are integrated with each other in the connecting portion between the conductor layer and the base portion. Where the laminated capacitor 100 in which the base portions 121d and 122d include a glass component and a Cu component is manufactured, a conductive paste including a glass component and a Cu component is preferably applied to the multilayer body obtained by calcination, and then the applied conductive paste is calcined.

Next, the cover portions are formed by plating processing so as to cover the base portions (step S20). By the cover portions being formed, the outer electrodes are provided.

The laminated capacitor 100 is manufactured by the above-described sequence of steps.

Figure 7:
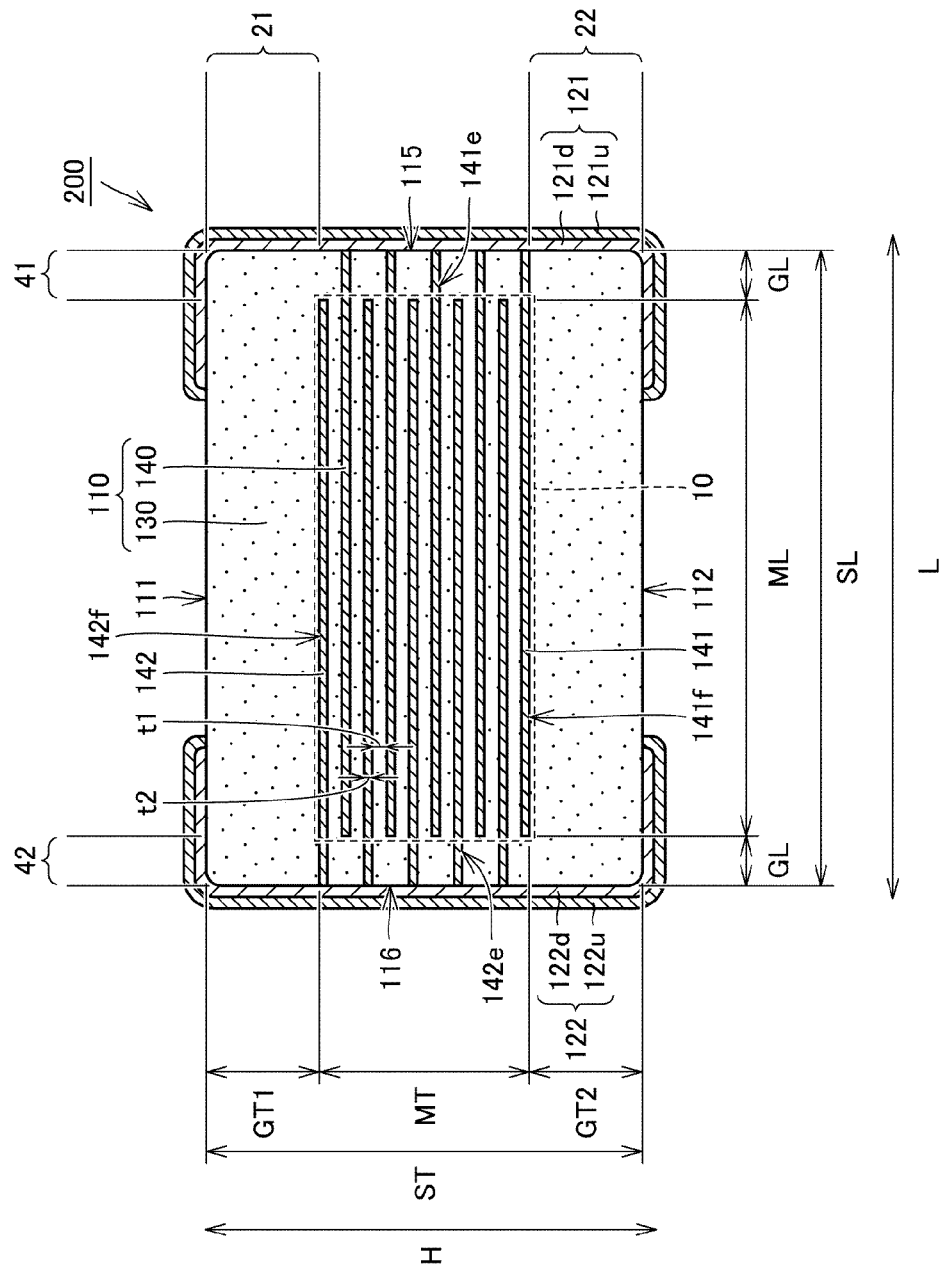
FIG. 7 is a cross-sectional view of a laminated capacitor according to a variation of the first preferred embodiment of the present invention when cut along the same line as the line II-II in FIG. 1.
Figure 8:
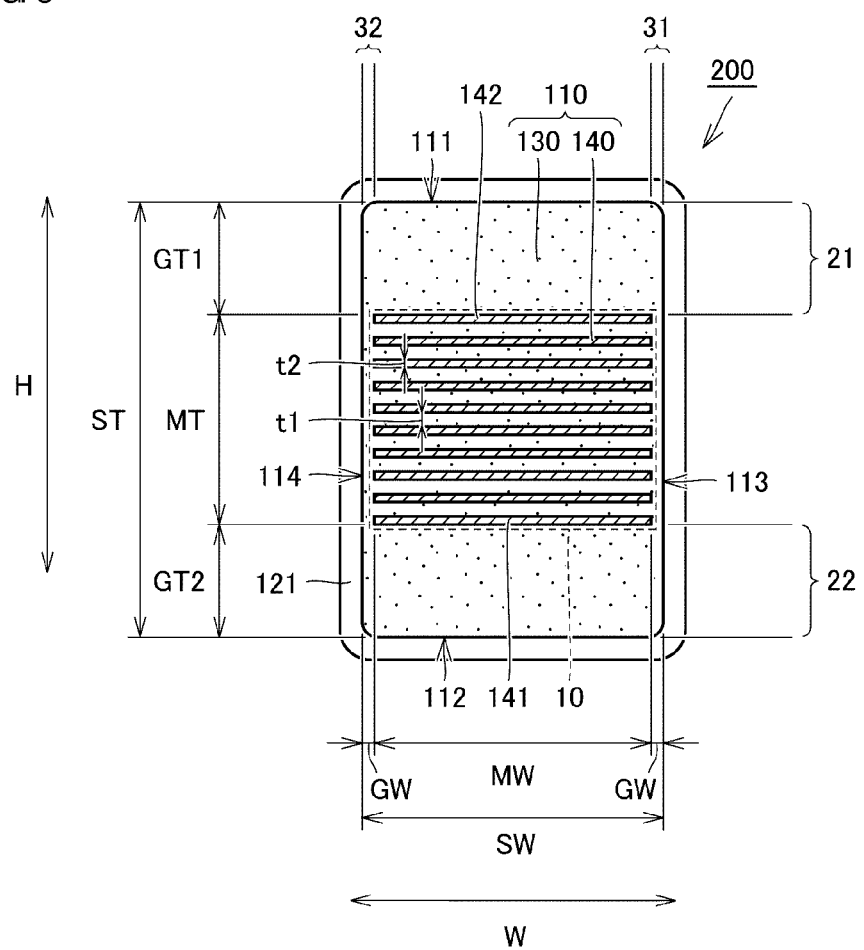
FIG. 8 is a cross-sectional view of the laminated capacitor according to a variation of the first preferred embodiment of the present invention when cut along the same line as the line III-III in FIG. 1.

Note that the thickness GT1 of the first outer surface portion 21 may be as thick as the thickness GT2 of the second outer layer portion 22. FIG. 7 is a cross-sectional view of a laminated capacitor according to a variation of the first preferred embodiment of the present invention when cut along the same line the line II-II in FIG. 1. FIG. 8 is a cross-sectional view of the laminated capacitor according to the variation of the first preferred embodiment of the present invention when cut along the same line as the line III-III arrow line direction in FIG. 1.

As shown in FIGS. 7 and 8, in a laminated capacitor 200 according to the variation of the first preferred embodiment of the present invention, relationships of GT1>GL>GW, GT2>GL>GW, SL>SW, and (SL/SW)>(ML/MW) are satisfied. At least one of the first outer layer portion 21 and the second outer layer portion may include a conductor layer that does not substantially contribute to generation of electrostatic capacitance as in a fourth preferred embodiment that will be described later.

Figure 9:
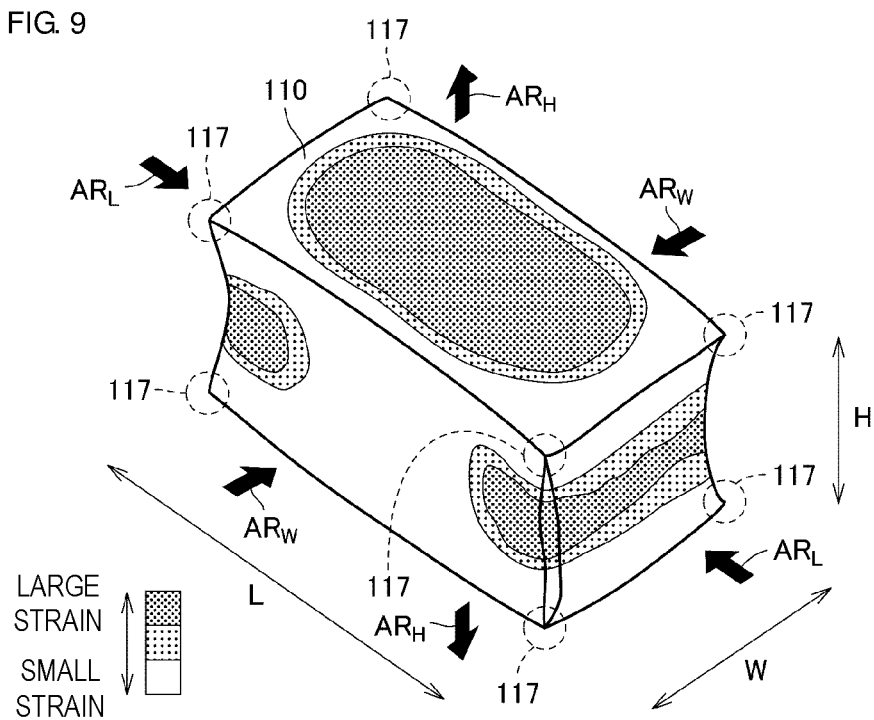
FIG. 9 is a diagram illustrating a result of a simulation in which strain generated when a voltage applied to a multilayer body of the laminated capacitor according to the first preferred embodiment of the present invention is simulated.

FIG. 9 is a diagram illustrating a result of a simulation in which strain generated when a voltage being applied to the multilayer body of the laminated capacitor according to the first preferred embodiment is simulated. As shown in FIG. 9, when the voltage is applied, the multilayer body is strained toward outer side portions along the height direction H as indicated by arrow marks $AR_H$ in the drawing. With this condition, in order to maintain the volume of the multilayer body, the multilayer body is strained toward inner side portions along the lengthwise direction L as indicated by arrow marks $AR_L$ in the drawing, and is also strained toward inner side portions along the width direction W, as indicated by arrow marks $AR_W$ in the drawing. Meanwhile, strain is not significantly generated in corner portions 117 of the multilayer body 110.

As such, the strain of the laminated capacitor is repeatedly generated corresponding to the period of the voltage applied to the laminated capacitor. This causes a circuit board on which the laminated capacitor is mounted to vibrate. Where a vibration frequency of the circuit board falls within an audible sound range, the vibration is recognized as noise by persons.

More specifically, the strain in the arrow mark $AR_L$ direction and the strain in the arrow mark $AR_W$ direction are propagated to a wiring board through a binder, thereby generating noise. In order to maintain the volume of the multilayer body, the strain in the arrow mark $AR_L$ direction and the strain in the arrow mark $AR_W$ direction attempt to maintain a state of equilibrium with the strain in the arrow mark $AR_H$ direction.

Where the length ML of the main portion is greater than the width MW thereof, the strain in the arrow mark $AR_L$ is greater than the strain in the arrow mark $AR_W$ direction. Because of this, the strain in the arrow mark $AR_L$ direction is a dominant factor of noise that is generated from a mounting body of the laminated capacitor.

In the laminated capacitors 100 and 200, satisfying a relation of GL>GW makes it possible to reduce or prevent the strain in the arrow mark $AR_L$ direction. In other words, making GL larger strengthens an effect of reducing or preventing the strain in the arrow mark $AR_L$ direction, and making GW smaller weakens an effect of reducing or preventing the strain in the arrow mark $AR_W$ direction. As a result, a distribution factor of the strain in the arrow mark $AR_L$ direction is lowered so that a deviation in strain inside the multilayer body 110 of the laminated capacitor 100 and 200 is decreased. This makes it possible to effectively reduce acoustic noise.

Because a relation of GT2>GL>GW is satisfied in the laminated capacitors 100 and 200, the strain of the second outer layer portion 22 in the arrow mark $AR_L$ direction is reduced or prevented. Because a relation of GT1>GL>GW is satisfied in the laminated capacitors 200, the strain of the first outer layer portion 21 in the arrow mark $AR_L$ direction is reduced or prevented. With this configuration, the distribution factor of the strain in the arrow mark $AR_L$ direction is further reduced so that the deviation in the strain inside the multilayer body 110 of the laminated capacitor 100 and 200 is decreased. This makes it possible to more effectively reduce the acoustic noise.

As is understood from the above description, making ML/MW smaller reduces or prevents the strain in the arrow mark $AR_L$ direction and reduces acoustic noise. In particular, where the relationship of (SL/SW)>(ML/MW) is satisfied, the acoustic noise is even more effectively reduced.

In order to verify a mechanism of reducing acoustic noise, an experimental example in which sound pressure of noise generated from the mounting body of the laminated capacitor was measured is described below. In the experiment, the thicknesses GT1 and GT2 of the first outer layer portion 21 and the second outer layer portion 22, the length GL of each of the first end portion 41 and the second end portion 42, and the width GW of each of the first side portion 31 and the second side portion 32 were changed.

Seven different types of laminated capacitors, that is, laminated capacitors of comparative example 1 through comparative example 4 and working example 1 through working example 3 were prepared by changing GT1, GT2, GL, and GW while maintaining the outside dimensions of the multilayer body 110 so as to be the same.

TABLE 1

|  | ST (μm) | SL (μm) | SW (μm) | GT1, GT2 (μm) | GL (μm) | GW (μm) |
| --- | --- | --- | --- | --- | --- | --- |
| Comparative Example 1 | 660 | 1090 | 660 | 50 | 50 | 50 |
| Comparative Example 2 | 660 | 1090 | 660 | 75 | 50 | 50 |
| Comparative Example 3 | 660 | 1090 | 660 | 75 | 20 | 50 |
| Comparative Example 4 | 660 | 1090 | 660 | 20 | 50 | 50 |
| Working Example 1 | 660 | 1090 | 660 | 75 | 50 | 20 |
| Working Example 2 | 660 | 1090 | 660 | 100 | 50 | 20 |
| Working Example 3 | 660 | 1090 | 660 | 75 | 60 | 30 |

Table 1 indicates respective dimensions of the seven laminated capacitors of comparative example 1 through comparative example 4 and working example 1 through working example 3. As shown in Table 1, in the laminated capacitors of comparative example 1 through comparative example 4 and working example 1 through working example 3, the following settings were used: ST=660 μm, SL=1090 μm, and SW=660 μm.

For GT1 and GT2, the following values were set: 50 μm in comparative example 1, 75 μm in comparative example 2, 75 μm in comparative example 3, 20 μm in comparative example 4, 75 μm in working example 1, 100 μm in working example 2, and 75 μm in working example 3. To GL, the following values were set: 50 μm in comparative example 1, 50 μm in comparative example 2, 20 μm in comparative example 3, 50 μm in comparative example 4, 50 μm in working example 1, 50 μm in working example 2, and 60 μm in working example 3. To GW, the following values were set: 50 μm in comparative example 1, 50 μm in comparative example 2, 50 μm in comparative example 3, 50 μm in comparative example 4, 20 μm in working example 1, 20 μm in working example 2, and 30 μm in working example 3.

TABLE 2

|  | SL/SW | ML/MW | Sound Pressure Difference (dB) |
| --- | --- | --- | --- |
| Comparative Example 1 | 1.65 | 1.77 | Reference |
| Comparative Example 2 | 1.65 | 1.77 | −3.7 |
| Comparative Example 3 | 1.65 | 1.88 | +1.1 |
| Comparative Example 4 | 1.65 | 1.77 | +2.6 |
| Working Example 1 | 1.65 | 1.60 | −6.9 |
| Working Example 2 | 1.65 | 1.60 | −10.2 |
| Working Example 3 | 1.65 | 1.62 | −6.1 |

Table 2 indicates, in the seven types laminated capacitors of comparative examples 1 through 4 and working examples 1 through 3, ML/MW, SL/SW, and differences in sound pressure of noise compared to the sound pressure of noise generated from the mounting body of the laminated capacitor in comparative example 1.

As shown in Table 2, SL/SW equals 1.65 in the laminated capacitors of comparative examples 1 through 4 and working examples 1 through 3. Values of ML/MW are as follows: 1.77 in comparative example 1, 1.77 in comparative example 2, 1.88 in comparative example 3, 1.77 in comparative example 4, 1.60 in working example 1, 1.60 in working example 2, and 1.62 in working example 3.

In the laminated capacitors of comparative examples 1 through 4 and working examples 1 through 3, electrostatic capacitance of each laminated capacitor was set to about 10 µF by adjusting the average thickness t1 of the dielectric layer within a range of approximately 0.66 µm to approximately 1.0 µm, and also adjusting the number of laminated layers of the conductor layers within a range of approximately 300 to approximately 500.

Figure 10:
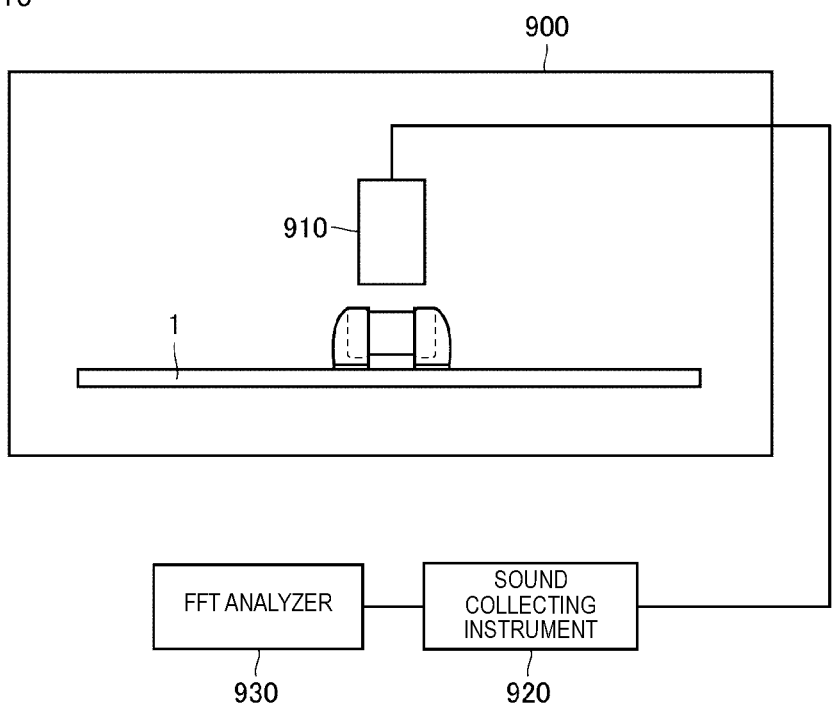
FIG. 10 is a schematic diagram illustrating a method of measuring the sound pressure of noise in an experimental example.

FIG. 10 is a schematic diagram illustrating a method of measuring the sound pressure of noise in the experimental example. As shown in FIG. 10, at the time of measuring the sound pressure of noise, the mounting body of the laminated capacitor is disposed inside an anechoic box 900; in this state, an approximately 1.0 Vpp AC voltage in a frequency band of approximately 1.0 kHz to approximately 5.0 kHz is applied to the laminated capacitor mounted on a component mounting board 1, and a total sound pressure level (maximum value) of noise generated when the stated voltage is applied was measured.

The measurement of the total sound pressure level of noise can be performed in the following manner: inside the anechoic box 900, a sound collecting microphone 910 is disposed above the laminated capacitor at a position opposing the laminated capacitor and being spaced therefrom by about 3 mm, sound that is generated from the mounting body of the laminated capacitor is collected using the sound collecting microphone 910 and a sound collecting instrument 920, and then the collected sound is analyzed using the FFT (Fast Fourier Transform) analyzer 930 (manufactured by ONO SOKKI Colo., LTD.).

As shown in Table 2, the sound pressure of noise generated from the mounting body of each laminated capacitor was, with respect to the sound pressure in comparative example 1, −3.7 dB in comparative example 2, +1.1 dB in comparative example 3, +2.6 dB in comparative example 4, −6.9 dB in working example 1, −10.2 dB in working example 2, and −6.1 dB in working example 3.

As understood from the results of comparative examples 1, 2, and 4, as GT1 and GT2 become larger, the sound pressure of noise generated from the mounting body of the laminated capacitor is reduced. As understood from the results of comparative examples 2 and 3 and working example 1, as GL becomes larger, the sound pressure is reduced. Further, as GW becomes smaller, the sound pressure is reduced. In working examples 1 through 3 satisfying a relation of (SL/SW)>(ML/MW), the sound pressure is smaller than any of comparative examples 1 through 4. In working example 2, GT is larger than in working example 1, and the difference in sound pressure is larger than working example 1 by −3.3 dB. Accordingly, of GT, GL, and GW, GT has the greatest influence on the sound pressure. In working example 3, GL and GW are smaller than in working example 1, and the difference in sound pressure from that of working example 1 is +0.8 dB. Accordingly, GW has a greater influence on the sound pressure than GL.

The above-described configurations are particularly effective with a laminated capacitor in which SL is no less than approximately 900 µm and no more than approximately 1800 µm, SW is no less than approximately 450 µm and no more than approximately 1000 µm, and the electrostatic capacitance is equal to or larger than approximately 1 µF.

Satisfying the following conditions makes it possible to more effectively reduce the acoustic noise. To be specific, it is preferable for GT2 to be equal to or greater than approximately 0.15×ST, for example. Alternatively, it is preferable for GT2 to be equal to or greater than approximately 100 µm, for example. It is preferable that GL be equal to or greater than approximately 50 µm and GW be smaller than approximately 50 µm, for example. Alternatively, it is preferable for GL to be greater than approximately 2.5×GW, for example.

It is preferable for GT2 to be greater than 2×GL, for example. In this case, deformation due to the strain at a side at which the first end surface 115 or second end surface 116 intersects with the second main surface 112 becomes small, such that the acoustic noise is effectively reduced.

It is preferable for MW to be greater than MT, for example. In this case, deformation due to the strain at the side at which the first end surface 115 or second end surface 116 intersects with the second main surface 112 becomes small, such that the acoustic noise is effectively reduced. Further, on the first side surface 113 and the second side surface 114, differently-colored regions each having a band shape that extend in the lengthwise direction L corresponding to the conductor layers 140 are provided. The color of each differently-colored region is deeper than the colors of the regions corresponding to the first outer layer portion 21 and the second outer layer portion 22 and is also deeper than the colors of the first main surface 111 and the second main surface 112, and is close to the color of black. As such, the directions of the laminated capacitor can be easily recognized with regard to the width direction and height direction thereof.

It is preferable for SL/SW to be smaller than approximately 2, for example. As SL/SW becomes larger, respective areas of the first end surface 115 and the second end surface 116 become relatively small, such that strain in the first end surface 115 and strain in the second end surface 116 become larger. This increases the acoustic noise. Accordingly, it is preferable to satisfy the relationship of SL/SW<approximately 2, for example. Further, it is preferable for ML/MW to be greater than approximately 1.5, for example. This makes it possible to secure electrostatic capacitance of the laminated capacitor. That is, it is preferable for the laminated capacitor to satisfy a relation of approximately 2>(SL/SW)>(ML/MW)>approximately 1.5, for example.

Where the first outer layer portion 21 or the second outer layer portion 22 is made thicker than the other outer layer portion, internal stress, which is generated due to a difference in heat shrinkage rates at the time of calcination between the dielectric layer 130 and conductor layer 140 of the soft multilayer body whose surface has been applied the conductive paste, acts on an interface between the first outer layer portion 21 or the second outer layer portion 22 and the main portion 10. This causes cracks (delamination) to be generated in some cases.

In the present preferred embodiment, since the soft multilayer body and the conductive paste are calcined at the same time, the soft multilayer body is compressed in the height direction H when the conductive paste shrinks. This makes it possible to prevent separation of the first outer layer portion 21 or the second outer layer portion 22 from the main portion 10. Further, in order to prevent the separation of the first outer layer portion 21 as well as the second outer layer portion 22 from the main portion 10, it is preferable that both of a dimension of the first outer layer portion 21 in the height direction H and a dimension of the second outer layer portion 22 in the height direction H be smaller than approximately one third of a dimension of the multilayer body 110 in the height direction H, for example.

Adjusting the material used for the first outer layer portion 21 or the second outer layer portion 22 also makes it possible to prevent the separation of the first outer layer portion 21 or the second outer layer portion 22 from the main portion 10.

Alternatively, close contact capabilities between the ceramic green sheets may be increased by adjusting the amount of binder of the green sheets used for the first outer layer portion 21 or the second outer layer portion 22. For example, where the amount of binder is increased, the amount of binder that is not coupled with ceramics increases so that the close contact capabilities of the green sheets are increased. Where the amount of binder is decreased, because a ceramic void ratio increases, the fluidity of the ceramic green sheets increases, such that close contact capabilities of the first side portion 31 and the second side portion 32 of the multilayer body 110 are increased at the time of pressure-binding. With the close contact capabilities of the first side portion 31 and the second side portion 32 being increased, the separation of the first outer layer portion 21 or the second outer layer portion 22 from the main portion 10 is effectively prevented.

Second Preferred Embodiment

Hereinafter, a laminated capacitor according to a second preferred embodiment of the present invention will be described. Because the laminated capacitor according to the second preferred embodiment differs from the laminated capacitor according to the first preferred embodiment only in that the second outer layer portion includes two layers having different material compositions, the descriptions of other constituent elements will not be repeated.

Figure 11:
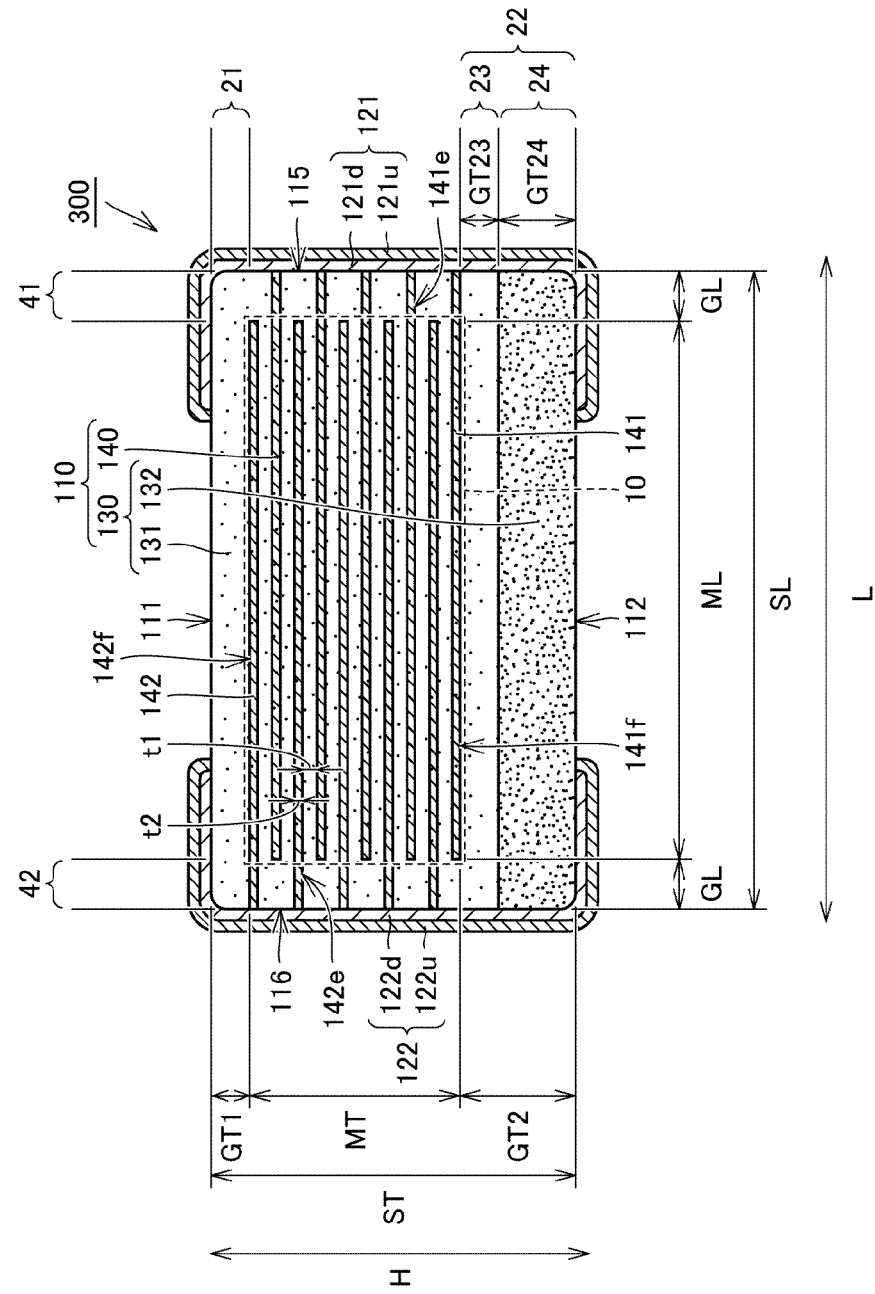
FIG. 11 is a cross-sectional view of a laminated capacitor according to a second preferred embodiment of the present invention when cut along the same line as the line II-II in FIG. 1.
Figure 12:
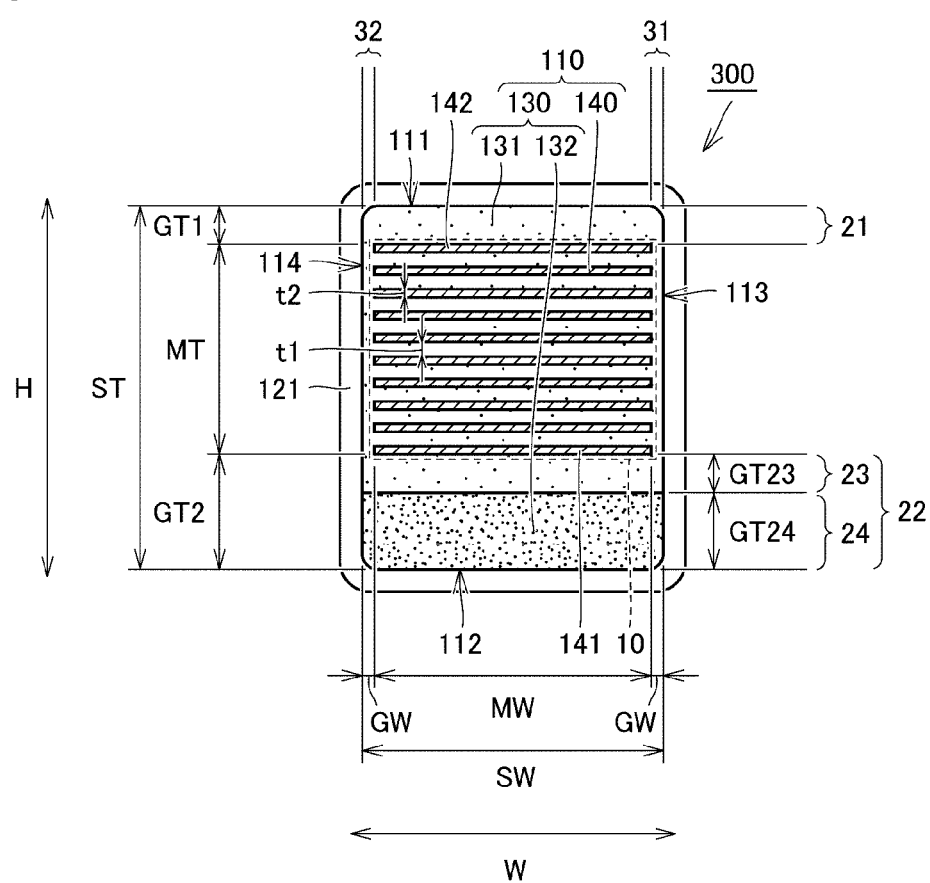
FIG. 12 is a cross-sectional view of the laminated capacitor according to the second preferred embodiment of the present invention when cut along the same line as the line III-III in FIG. 1.

FIG. 11 is a cross-sectional view of the laminated capacitor according to the second preferred embodiment of the present invention when cut along the same line as the line II-II in FIG. 1. FIG. 12 is a cross-sectional view of the laminated capacitor according to the second preferred embodiment of the present invention when cut along the same line as the line III-III in FIG. 1.

As shown in FIGS. 11 and 12, in a laminated capacitor 300 according to the second preferred embodiment of the present invention, the second outer layer portion 22 includes an inner side portion layer 23 adjacent to the main portion 10, and an outer side portion layer 24 that is adjacent to the inner side portion layer 23 and defines the second main surface 112. Material composition of the outer side portion layer 24 and material composition of the inner side portion layer 23 are different from each other. Where a thickness of the inner side portion layer 23 is GT23 and a thickness of the outer side portion layer 24 is GT24, it is preferable to satisfy a relationship of GT24≥GT23, for example.

A second dielectric layer 132 defining the outer side portion layer 24 preferably includes a larger amount of Si than a first dielectric layer 131 defining the inner side portion layer 23. The dielectric layer with a higher Si content percentage has a larger heat shrinkage rate at the time of calcination. As such, the outer side portion layer 24 has a larger heat shrinkage rate than the inner side portion layer 23 at the time of calcination. As a result, the heat shrinkage rate of the outer side portion layer 24 is close or similar to that of the conductor layer 140 of the main portion 10.

Accordingly, in the laminated capacitor 300, internal stress that acts on an interface between the main portion 10 and the second outer layer portion 22 due to a difference in heat shrinkage rates between the dielectric layer 130 and the conductor layer 140 at the time of calcination is reduced or alleviated. This makes it possible to prevent the generation of a crack (delamination) in the interface between the main portion 10 and the second outer layer portion 22.

Hereinafter, a non-limiting example of a manufacturing method for the laminated capacitor 300 according to the present preferred embodiment will be described.

Figure 13:
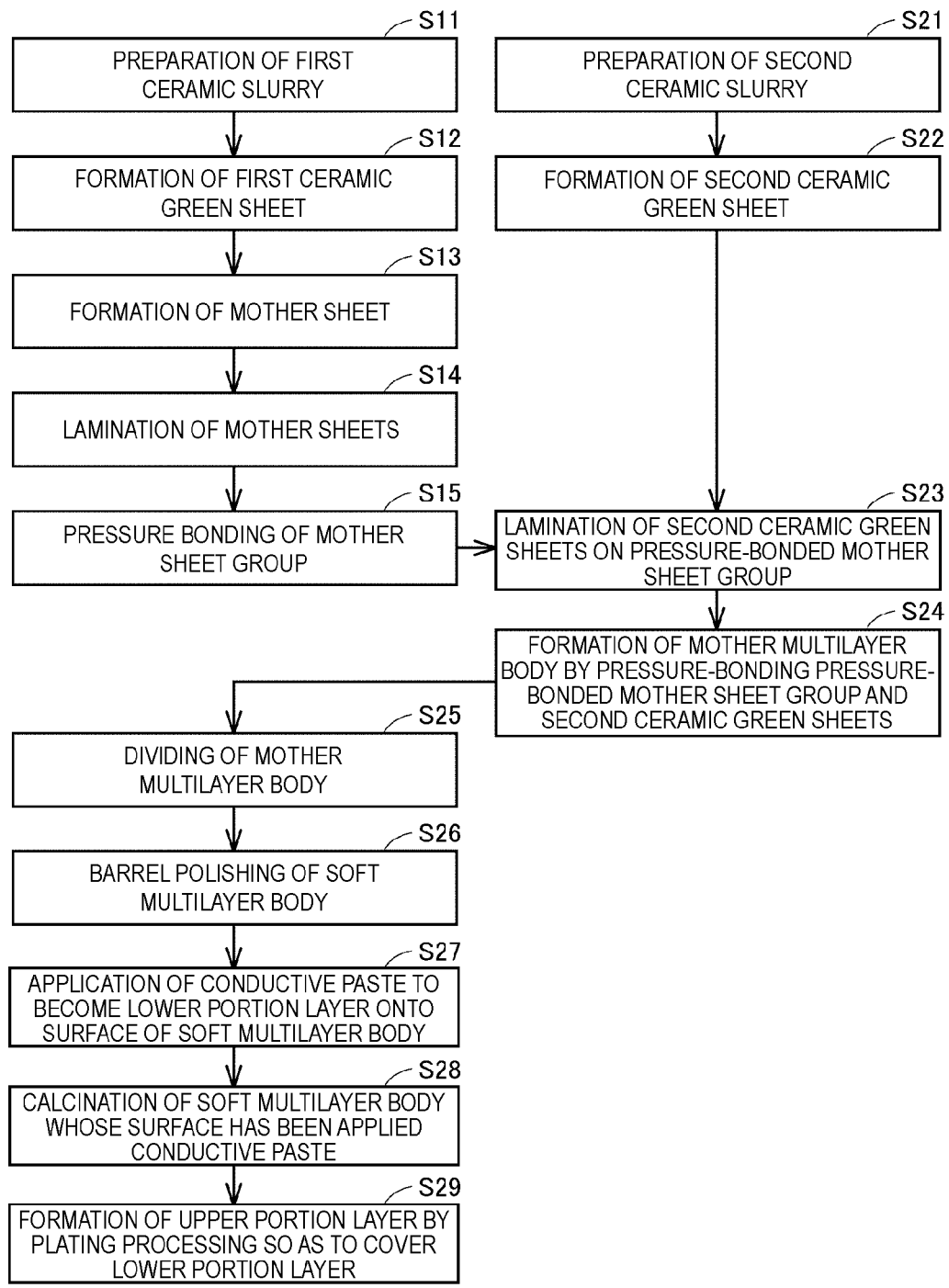
FIG. 13 is a flowchart illustrating a manufacturing method for the laminated capacitor according to the second preferred embodiment of the present invention.

FIG. 13 is a flowchart illustrating the manufacturing method for the laminated capacitor according to the second preferred embodiment of the present invention. As shown in FIG. 13, in the manufacturing of the laminated capacitor 300, a first ceramic slurry is prepared (step S11). First ceramic green sheets are formed (step S12). Mother sheets are formed (step S13). The mother sheets are laminated (step S14). A group of mother sheets are pressure-bonded (step S15).

Next, a second ceramic slurry is prepared (step S21). A larger amount of Si is added to the second ceramic slurry than to the first ceramic slurry. Second ceramic green sheets are formed (step S22).

Subsequently, the plurality of second ceramic green sheets are laminated on the group of mother sheets having been pressure-bonded in step S15 (step S23). More specifically, the plurality of second ceramic green sheets defining the outer side portion layer 24 are laminated on the mother sheets defining the inner side portion layer 23. Then, the group of mother sheets having been pressure-bonded in step S15 and the plurality of second ceramic green sheets are pressure-bonded (step S24).

Next, a mother multilayer body is divided (step S25). Soft multilayer bodies are barrel polished (step S26). A conductive paste that will become base portions is applied onto the surface of the soft multilayer body (step S27). The soft multilayer body, onto the surface of which the conductive paste has been applied, is calcined (step S28). Cover portions are formed by plating processing so as to cover the base portions (step S29).

The laminated capacitor 300 is manufactured using the above-described sequence of steps.

In the laminated capacitor 300 according to the present preferred embodiment, a deviation in the strain inside the multilayer body 110 is decreased, so as to more effectively reduce the acoustic noise.

The outer side portion layer 24 may include the second dielectric layer 132 in which a composition ratio of inorganic material, such as Mg, Al, a rare earth element, or other suitable material, for example, is different from that of the first dielectric layer 131 defining the inner side portion layer 23, or may include the second dielectric layer 132 in which a particle size of ceramics is different from that of the first dielectric layer 131 defining the inner side portion layer 23.

Third Preferred Embodiment

Hereinafter, a laminated capacitor according to a third preferred embodiment of the present invention will be described. The laminated capacitor according to the third preferred embodiment of the present invention differs from the laminated capacitor according to the first preferred embodiment only in that the first side portion and the second side portion are formed by calcining dielectric sheets that are applied to a soft multilayer body. As such, the descriptions of other elements will not be repeated.

Figure 14:
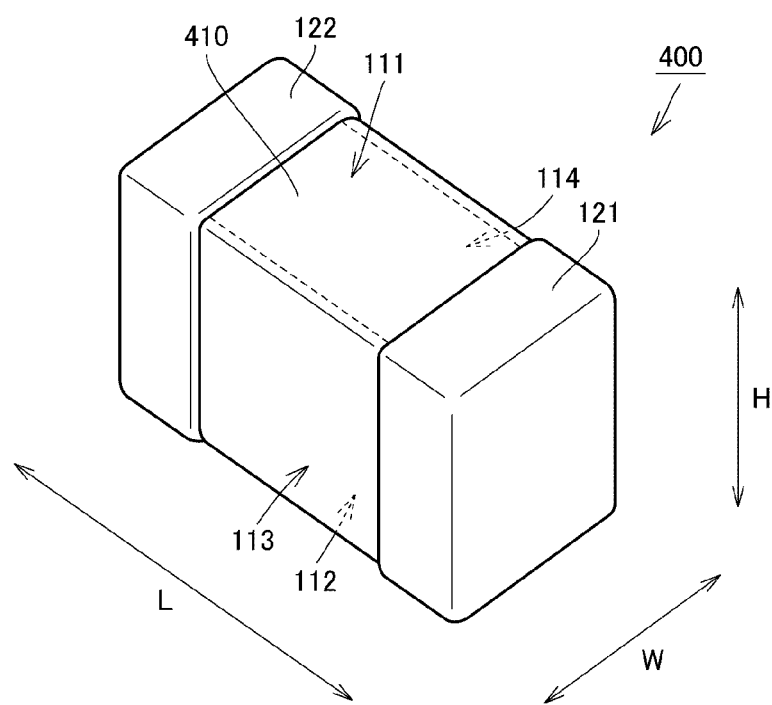
FIG. 14 is a perspective view illustrating an external appearance of a laminated capacitor according to a third preferred embodiment of the present invention.
Figure 15:
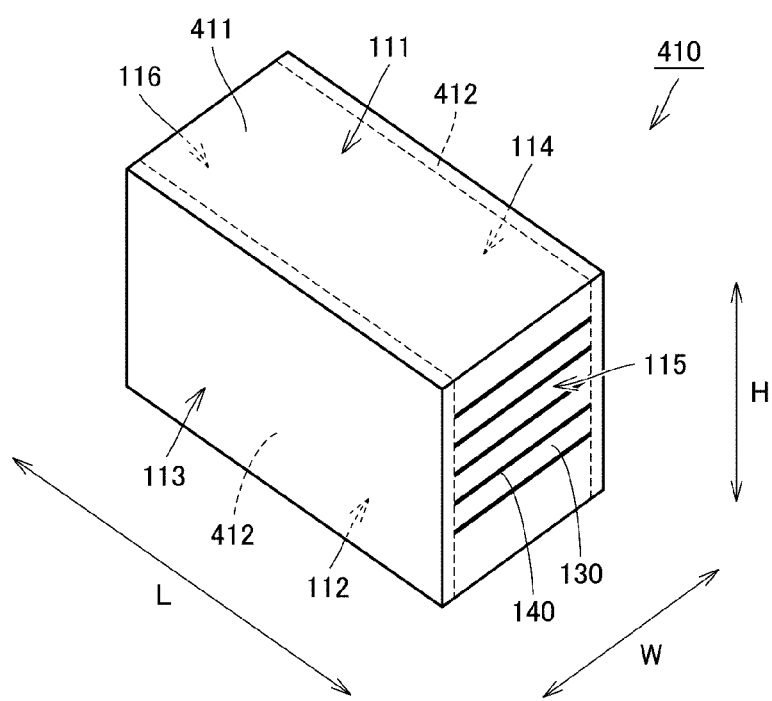
FIG. 15 is a perspective view illustrating an external appearance of a multilayer body of the laminated capacitor according to the third preferred embodiment of the present invention.
Figure 16:
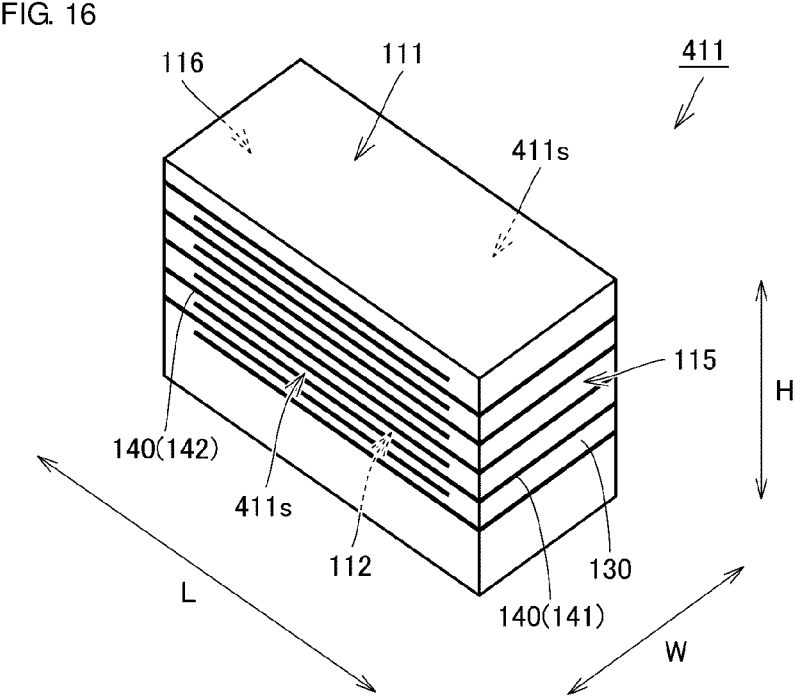
FIG. 16 is a perspective view illustrating an external appearance of a base section of the multilayer body of the laminated capacitor according to the third preferred embodiment of the present invention.

FIG. 14 is a perspective view illustrating an external appearance of the laminated capacitor according to the third preferred embodiment of the present invention. FIG. 15 is a perspective view illustrating an external appearance of a multilayer body of the laminated capacitor according to the third preferred embodiment of the present invention. FIG. 16 is a perspective view illustrating an external appearance of a base section of the multilayer body of the laminated capacitor according to the third preferred embodiment of the present invention.

As shown in FIGS. 14 to 16, in a laminated capacitor 400 according to the third preferred embodiment of the present invention, a multilayer body 410 includes a base section 411 and two side portions 412 provided so as to cover both side surfaces 411s of the base section 411.

The multilayer body 410 is formed such that dielectric sheets that will become the side portions 412 are applied or pasted to both sides of a soft multilayer body that will become a base section 411, and then thermally pressure-bonded and calcined. Forming the multilayer body 410 in this manner makes it possible to increase respective densities of the two side portions 412, because the ceramic green sheet does not have fluidity, unlike forming the first side portion 31 and second side portion 32 of the multilayer body 110 of the laminated capacitor 100 according to the first preferred embodiment.

The two side portions 412 effectively prevent the separation of the first outer layer portion or the second outer layer portion from the main portion because the two side portions 412 firmly connect the first and second outer layer portions and the main portion in the multilayer body 410.

In the base portion 411, the ends of the plurality of conductor layers 140 in the width direction W are aligned with each other. On the other hand, the ends of the plurality of conductor layers 140 in the lengthwise direction L are shifted from each other in the lengthwise direction L. A distance between two ends that are spaced the farthest from each other in the width direction W among the ends of the plurality of conductor layers 140, is preferably shorter than a distance between two ends that are spaced the farthest from each other in the lengthwise direction L among the ends of the plurality of conductor layers 140.

In the laminated capacitor 400 according to the present preferred embodiment, a deviation in strain inside the multilayer body 410 is decreased such that acoustic noise is more effectively reduced.

Fourth Preferred Embodiment

Hereinafter, a laminated capacitor according to a fourth preferred embodiment of the present invention will be described. The laminated capacitor according to the fourth preferred embodiment of the present invention differs from the laminated capacitor according to the first preferred embodiment only in that the first outer layer portion and the second outer layer portion include conductor layers. As such, the descriptions of other elements will not be repeated.

Figure 17:
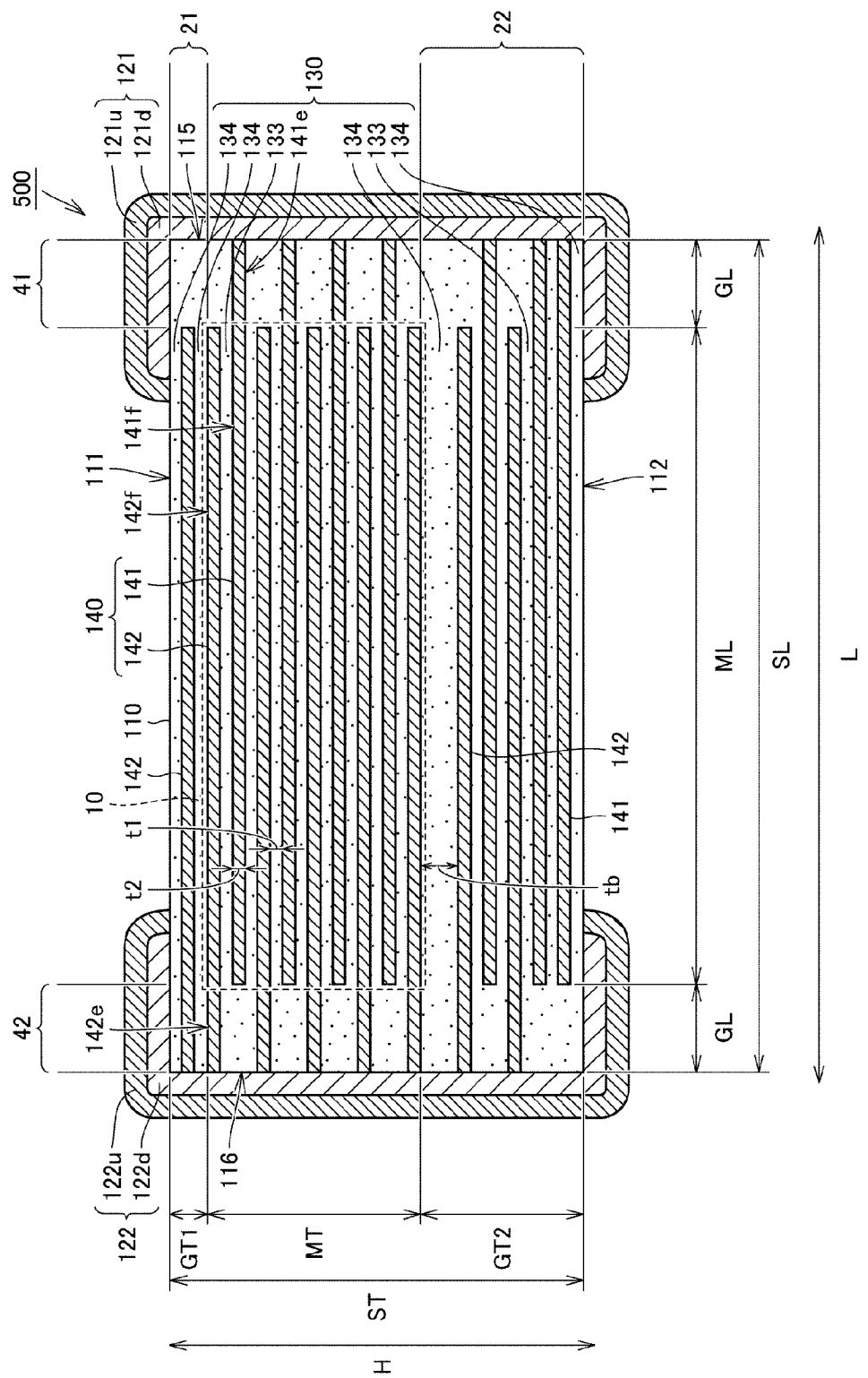
FIG. 17 is a cross-sectional view of a laminated capacitor according to a fourth preferred embodiment of the present invention when cut along the same line as the line II-II in FIG. 1.

FIG. 17 is a cross-sectional view of the laminated capacitor according to the fourth preferred embodiment of the present invention when cut along the same line as the line II-II in FIG. 1. As shown in FIG. 17, in a laminated capacitor 500 according to the fourth preferred embodiment of the present invention, the main portion 10 is a region where the greatest number of the opposing portions 141f and 142f opposing each other of the first conductor layers 141 and the second conductor layers 142 are laminated. In the main portion 10, an effective dielectric layer 133 is sandwiched between the first conductor layer 141 and the second conductor layer 142 adjacent to each other. The effective dielectric layer 133 is a dielectric layer in which electrostatic capacitance is generated.

The first outer layer portion 21 is between the main portion 10 and the first main surface 111 in the lamination direction of the multilayer body 110, and includes a non-effective dielectric layer 134, among the plurality of dielectric layers 130, that defines the first main surface 111. The non-effective dielectric layer 134 is a dielectric layer in which electrostatic capacitance is not substantially generated. In the present preferred embodiment, the first outer layer portion 21 preferably includes a conductor layer that is one of a pair of the second conductor layers 142 adjacent to each other and sandwiching the non-effective dielectric layer 134 adjacent to the main portion 10 therebetween, and does not substantially contribute to the generation of electrostatic capacitance.

The second outer layer portion 22 is between the main portion 10 and the second main surface 112 in the lamination direction of the multilayer body 110, and includes at least one of the opposing portions 141f and 142f opposing each other of the first conductor layers 141 and the second conductor layers 142. Further, the second outer layer portion 22 includes at least one effective dielectric layer 133. A distance "tb" which is the shortest distance from the opposing portion within the second outer layer portion 22 to the opposing portion within the main portion is preferably greater than the average thickness t1 of the dielectric layer 130 in the main portion 10.

In the present preferred embodiment, the second outer layer portion 22 includes the non-effective dielectric layer 134, a pair of the first conductor layers 141 adjacent to each other and sandwiching the non-effective dielectric layer 134 therebetween, and one of a pair of the second conductor layers 142 adjacent to each other and sandwiching the non-effective dielectric layer 134 adjacent to the main portion 10 therebetween. The conductor layer that is nearest to the second main surface 112 is a conductor layer which does not substantially contribute to the generation of electrostatic capacitance.

Because of the second outer layer portion 22 including the conductor layer, internal stress that acts on the interface between the main portion 10 and the second outer layer portion 22 due to a difference in heat shrinkage rates between the dielectric layer 130 and the conductor layer 140 at the time of calcination is reduced or alleviated. This makes it possible to prevent the generation of a crack (delamination) in the interface between the main portion 10 and the second outer layer portion 22. Where an excessive number of the effective dielectric layers 133 are included in the second outer layer portion 22, acoustic noise is increased. As such, it is preferable that the number of the effective dielectric layers 133 included in the second outer layer portion 22 be equal to or less than about 5%, for example, of the number of the effective dielectric layers 133 included in the main portion 10. The first outer layer portion 21, similarly to the second outer layer portion 22, may also include the opposing portions 141f and 142f opposing each other of the first conductor layers 141 and the second conductor layers 142, respectively.

As in the laminated capacitor 200 according to a variation of the first preferred embodiment, the thickness GT1 of the first outer layer portion 21 may be the same or substantially the same as the thickness GT2 of the second outer layer portion 22. In this case, the first outer layer portion 21 is a region between the main portion 10 and the first main surface 111 in the lamination direction of the multilayer body 110, and includes the non-effective dielectric layer 134, among the plurality of dielectric layers 130, that defines the first main surface 111 and at least one of the plurality of conductor layers 140.

Because the first outer layer portion 21 includes the conductor layer, internal stress that acts on the interface between the main portion 10 and the first outer layer portion 21 due to a difference in heat shrinkage rates between the dielectric layer 130 and the conductor layer 140 at the time of calcination is reduced or alleviated. This prevents the generation of a crack (delamination) in the interface between the main portion 10 and the first outer layer portion 21.

Where the generation of delamination is prevented as discussed above, after having formed a multilayer body by calcining a soft multilayer body, a conductive paste may be applied onto a surface of the multilayer body and then the applied conductive paste may be calcined.

Hereinafter, a non-limiting example of a method of measuring thicknesses and distances inside a laminated capacitor will be described.

First, the laminated capacitor is embedded in a resin. An LT cross-section that passes through the center of the multilayer body and is parallel or substantially parallel to a side surface of the multilayer body is exposed by polishing the laminated capacitor having been embedded in the resin. Ion milling is performed on the exposed LT cross-section to remove the sagging by polishing. Thereafter, the exposed LT cross-section is observed under a scanning electron microscope.

Figure 18:
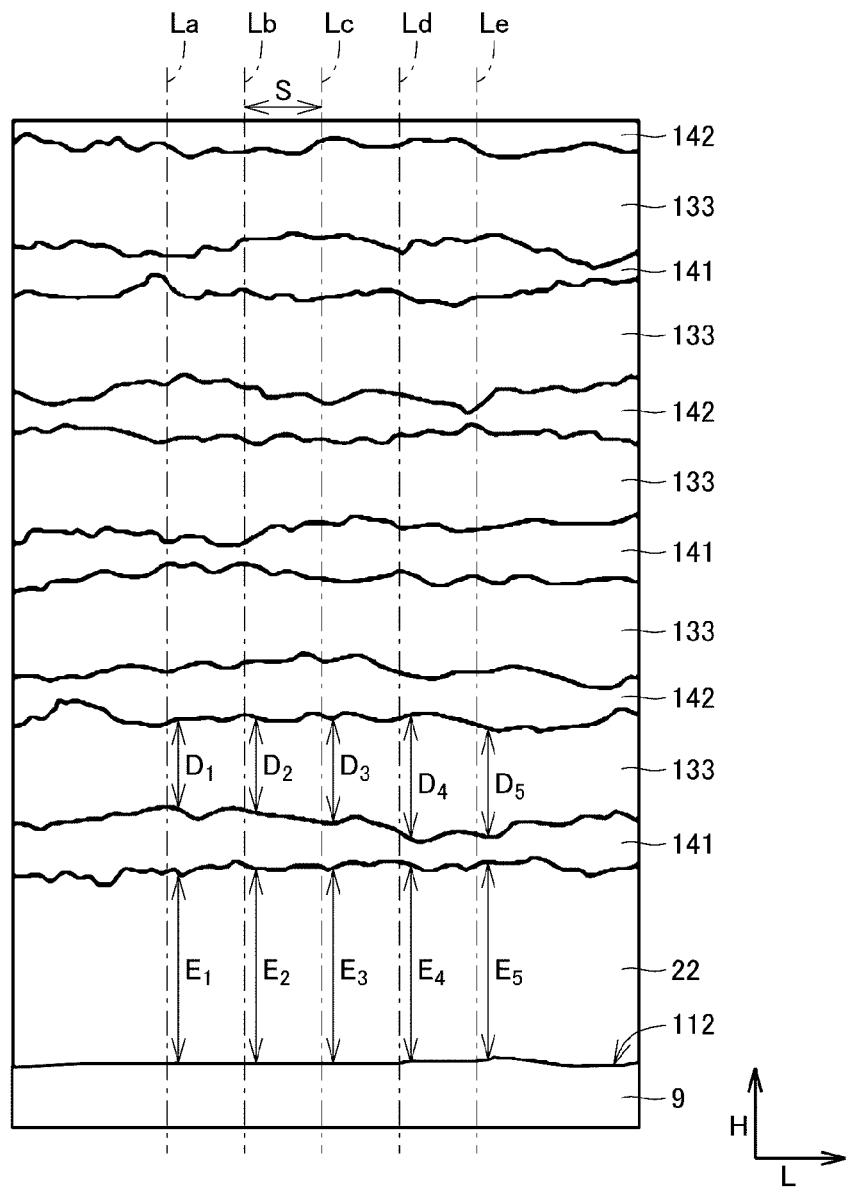
FIG. 18 is a diagram illustrating an example of a magnified image of an LT cross-section of a laminated capacitor observed under a scanning electron microscope.

FIG. 18 is a diagram illustrating an example of a magnified image of an LT cross-section of the laminated capacitor viewed under a scanning electron microscope. In FIG. 18, a portion of the second main surface 112 side of the laminated capacitor that is in contact with a resin 9 is illustrated.

Where thicknesses and distances inside the laminated capacitor are measured, a linear line Lc that extends in the lamination direction of the multilayer body and passes through the center of the multilayer body in the lengthwise direction is drawn first in the magnified image of the LT cross-section of the laminated capacitor viewed under the scanning electron microscope, as shown in FIG. 18. Next, a plurality of linear lines are drawn in parallel or substantially in parallel to the linear line Lc at equal or substantially equal intervals (pitch "S"). The pitch S may be determined to be about 5 to about 10 times the thickness or distance to measure; where a dielectric layer with a thickness of approximately 1 μm is measured, the pitch S is about 5 μm, for example. Note that the same numbers of linear lines are respectively drawn on both sides of the linear line Lc. In other words, odd numbers of linear lines including the linear line Lc are drawn. FIG. 18 illustrates a total of five linear lines from a linear line La through a linear line Le.

Next, thicknesses or distances are measured on the linear lines La through Le. However, note that, where an internal electrode is destroyed on the linear lines La through Le and dielectric layers sandwiching this internal electrode are connected to each other, or where the magnified image at the measurement position is unclear, the thicknesses or distances are measured on a linear line spaced farther from the linear line Lc.

For example, where a thickness of the effective dielectric layer 133 is measured, a thickness $D_1$ on the linear line La, a thickness $D_2$ on the linear line Lb, a thickness $D_3$ on the linear line Lc, a thickness $D_4$ on the linear line Ld, and a thickness $D_5$ on the linear line Le are measured, as shown in FIG. 18, and an average value of these thicknesses is used as the thickness of the effective dielectric layer 133.

Likewise, where a thickness of the second outer layer portion 22 is measured, a thickness $E_1$ on the linear line La, a thickness $E_2$ on the linear line Lb, a thickness $E_3$ on the linear line Lc, a thickness $E_4$ on the linear line Ld, and a thickness $E_5$ on the linear line Le are measured, as shown in FIG. 18, and an average value of these thicknesses is used as the thickness of the second outer layer portion 22. The same measurement method is used in both the case where respective widths of the first side portion 31 and the second side portion 32 are measured and the case where respective lengths of the first end portion 41 and the second end portion 42 are measured.

For example, where an average thickness of the plurality of effective dielectric layers 133 in the main portion 10 is calculated, thicknesses are measured in each of five effective dielectric layers 133 using the above-described method, and an average value of the thicknesses measured in the five effective dielectric layers 133 is used as the average thickness of the plurality of effective dielectric layers 133 in the main portion 10; the five effective dielectric layers 133 include the effective dielectric layer 133 substantially positioned at the center in the height direction H of the main portion 10, and each of the two effective dielectric layers 133 positioned on both sides of the effective dielectric layer 133 substantially positioned at the center in the height direction H.

Where the number of laminated layers of the effective dielectric layers 133 is less than five, the thicknesses are measured in all the effective dielectric layers 133 using the above-described method, and an average value of those measured thicknesses is used as the average thickness of the plurality of effective dielectric layers 133.

In the descriptions of the above preferred embodiments, configurations that are capable of being combined may be appropriately combined with each other.

The preferred embodiments disclosed herein are to be understood in all ways as exemplary and in no ways limiting. The scope of the present invention is defined by the appended claims rather than by the foregoing descriptions, and any meanings equivalent to the appended claims, as well as all modifications made within the scope of the appended claims, are intended to be encompassed in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated capacitor comprising:
   a multilayer body with a rectangular or substantially rectangular parallelepiped shape and including a plurality of dielectric layers and a plurality of conductor layers laminated in a lamination direction, a first main surface and a second main surface opposing each other in the lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and
   a first outer electrode and a second outer electrode provided on a portion of a surface of the multilayer body; wherein
   the plurality of conductor layers include a first conductor layer connected to the first outer electrode and a second conductor layer connected to the second outer electrode;
   the multilayer body includes:

a main portion in which opposing portions of the first conductor layer and the second conductor layer are laminated;
a first outer layer portion between the first main surface and the main portion;
a second outer layer portion between the second main surface and the main portion;
a side portion between the side surface and the main portion; and
an end portion between the end surface and the main portion; and
relationships GT1>GL>GW, GT2>GL>GW, SL>SW, and (SL/SW)>(ML/MW) are satisfied, where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

2. The laminated capacitor according to claim 1, wherein a relationship of 2>(SL/SW)>(ML/MW)>1.5 is satisfied.

3. The laminated capacitor according to claim 1, wherein the second outer layer portion includes an inner side portion layer adjacent to the main portion, and an outer side portion layer that is adjacent to the inner side portion layer and defines the second main surface; and
a material composition of the outer side portion layer is different from a material composition of the inner side portion layer.

4. The laminated capacitor according to claim 1, wherein at least each of the first and second outer electrodes includes a base portion directly covering a surface of the multilayer body, and a cover portion which covers the base portion;
the base portion is made of a material including a ceramic component and a Ni component;
the cover portion is made of a plating film; and
each of the plurality of conductor layers is made of a material containing a Ni component.

5. The laminated capacitor according to claim 4, wherein the Ni component of each of the plurality of conductor layers and the Ni component of the base portion are integrated with each other in a connecting portion between each of the plurality of conductor layers and the base portion.

6. The laminated capacitor according to claim 1, wherein a distance between two ends of the plurality of conductor layers that are farthest from each other in the width direction is shorter than a distance between two ends of the plurality of conductor layers that are farthest from each other in the lengthwise direction.

7. The laminated capacitor according to claim 1, wherein the side surfaces include a first side surface and a second side surface that oppose each other in the width direction;
the end surfaces include a first end surface and a second end surface that oppose each other in the lengthwise direction;
the side portions include a first side portion between the first side surface and the main portion, and a second side portion between the second side surface and the main portion;
the end portions include a first end portion between the first end surface and the main portion, and a second end portion between the second end surface and the main portion;
the width GW is a width of the first side portion or a width of the second side portion; and the length GL is a length of the first end portion or a length of the second end portion.

8. A laminated capacitor comprising:
a multilayer body with a rectangular or substantially rectangular parallelepiped shape and including a plurality of dielectric layers and a plurality of conductor layers laminated in a lamination direction, a first main surface and a second main surface that oppose each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and
a first outer electrode and a second outer electrode provided on a portion of a surface of the multilayer body; wherein
the plurality of conductor layers include a first conductor layer connected to the first outer electrode and a second conductor layer connected to the second outer electrode;
the multilayer body includes:
a main portion in which opposing portions of the first conductor layer and the second conductor layer are laminated;
a first outer layer portion between the first main surface and the main portion;
a second outer layer portion between the second main surface and the main portion;
a side portion between the side surface and the main portion; and
an end portion between the end surface and the main portion; and
relationships GT2>GT1, GT2>GL>GW, SL>SW, and (SL/SW)>(ML/MW) are satisfied, where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

9. The laminated capacitor according to claim 8, wherein a relationship of 2>(SL/SW)>(ML/MW)>1.5 is satisfied.

10. The laminated capacitor according to claim 8, wherein the second outer layer portion includes an inner side portion layer adjacent to the main portion, and an outer side portion layer that is adjacent to the inner side portion layer and defines the second main surface; and
a material composition of the outer side portion layer is different from a material composition of the inner side portion layer.

11. The laminated capacitor according to claim 8, wherein at least each of the first and second outer electrodes includes a base portion directly covering a surface of the multilayer body, and a cover portion which covers the base portion;
the base portion is made of a material including a ceramic component and a Ni component;
the cover portion is made of a plating film; and
each of the plurality of conductor layers is made of a material containing a Ni component.

12. The laminated capacitor according to claim 11, wherein the Ni component of each of the plurality of conductor layers and the Ni component of the base portion are integrated with each other in a connecting portion between each of the plurality of conductor layers and the base portion.

13. The laminated capacitor according to claim 8, wherein a distance between two ends of the plurality of conductor layers that are farthest from each other in the width direction is shorter than a distance between two ends of the plurality of conductor layers that are farthest from each other in the lengthwise direction.

14. The laminated capacitor according to claim 8, wherein
the side surfaces include a first side surface and a second side surface that oppose each other in the width direction;
the end surfaces include a first end surface and a second end surface that oppose each other in the lengthwise direction;
the side portions include a first side portion between the first side surface and the main portion, and a second side portion between the second side surface and the main portion;
the end portions include a first end portion between the first end surface and the main portion, and a second end portion between the second end surface and the main portion;
the width GW is a width of the first side portion or a width of the second side portion; and
the length GL is a length of the first end portion or a length of the second end portion.

15. A laminated capacitor comprising:
a multilayer body with a rectangular or substantially rectangular parallelepiped shape and including a plurality of dielectric layers and a plurality of conductor layers laminated in a lamination direction, a first main surface and a second main surface that oppose each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and
a first outer electrode and a second outer electrode provided on a portion of a surface of the multilayer body; wherein
the plurality of conductor layers include a first conductor layer connected to the first outer electrode and a second conductor layer connected to the second outer electrode;
the multilayer body includes:
a main portion in which a greatest number of opposing portions of the first conductor layer and the second conductor layer are laminated;
a first outer layer portion between the main portion and the first main surface;
a second outer layer portion between the main portion and the second main surface and including at least one of opposing portions of the first conductor layer and the second conductor layer;
a side portion between the side surface and the main portion; and
an end portion between the end surface and the main portion;
a shortest distance from the at least one opposing portion within the second outer layer portion to the opposing portion within the main portion is greater than an average thickness of the dielectric layer in the main portion, and relationships GT1>GL>GW, GT2>GL>GW, SL>SW, and (SL/SW)>(ML/MW) are satisfied, where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

16. The laminated capacitor according to claim 15, wherein a relationship of 2>(SL/SW)>(ML/MW)>1.5 is satisfied.

17. The laminated capacitor according to claim 15, wherein
the second outer layer portion includes an inner side portion layer adjacent to the main portion, and an outer side portion layer that is adjacent to the inner side portion layer and defines the second main surface; and
a material composition of the outer side portion layer is different from a material composition of the inner side portion layer.

18. The laminated capacitor according to claim 15, wherein at least each of the first and second outer electrodes includes a base portion directly covering a surface of the multilayer body, and a cover portion which covers the base portion;
the base portion is made of a material including a ceramic component and a Ni component;
the cover portion is made of a plating film; and
each of the plurality of conductor layers is made of a material containing a Ni component.

19. The laminated capacitor according to claim 18, wherein the Ni component of each of the plurality of conductor layers and the Ni component of the base portion are integrated with each other in a connecting portion between each of the plurality of conductor layers and the base portion.

20. The laminated capacitor according to claim 15, wherein a distance between two ends of the plurality of conductor layers that are farthest from each other in the width direction is shorter than a distance between two ends of the plurality of conductor layers that are farthest from each other in the lengthwise direction.

21. The laminated capacitor according to claim 15, wherein
the side surfaces include a first side surface and a second side surface that oppose each other in the width direction;
the end surfaces include a first end surface and a second end surface that oppose each other in the lengthwise direction;
the side portions include a first side portion between the first side surface and the main portion, and a second side portion between the second side surface and the main portion;
the end portions include a first end portion between the first end surface and the main portion, and a second end portion between the second end surface and the main portion;
the width GW is a width of the first side portion or a width of the second side portion; and
the length GL is a length of the first end portion or a length of the second end portion.

22. A laminated capacitor comprising:
a multilayer body with a rectangular parallelepiped shape and including a plurality of dielectric layers and a plurality of conductor layers laminated in a lamination direction, and a first main surface and a second main surface opposing each other in a lamination direction, side surfaces connecting the first main surface and the second main surface and being perpendicular or substantially perpendicular to a width direction, and end surfaces connecting the first main surface and the second main surface and being perpendicular or substantially perpendicular to a lengthwise direction; and a first outer electrode and a second outer electrode provided on a portion of a surface of the multilayer body; wherein the plurality of conductor layers include a first conductor layer connected to the first outer electrode and a second conductor layer connected to the second outer electrode;

the multilayer body includes:
- a main portion in which a greatest number of opposing portions of the first conductor layer and the second conductor layer opposing each other are laminated;
- a first outer layer portion between the main portion and the first main surface;
- a second outer layer portion between the main portion and the second main surface and including at least one of opposing portions of the first conductor layer and the second conductor layer opposing each other;
- a side portion between the side surface and the main portion; and
- an end portion between the end surface and the main portion;

a shortest distance from the opposing portion within the second outer layer portion to the opposing portion within the main portion is greater than an average thickness of one of the dielectric layers in the main portion; and relationships GT2>GT1, GT2>GL>GW, SL>SW, and (SL/SW)>(ML/MW) are satisfied, where a thickness of the first outer layer portion is GT1, a thickness of the second outer layer portion is GT2, a width of the side portion is GW, a length of the end portion is GL, a length of the multilayer body is SL, a width of the multilayer body is SW, a length of the main portion is ML, and a width of the main portion is MW.

23. The laminated capacitor according to claim 22, wherein a relationship of 2>(SL/SW)>(ML/MW)>1.5 is satisfied.

24. The laminated capacitor according to claim 22, wherein
the second outer layer portion includes an inner side portion layer adjacent to the main portion, and an outer side portion layer that is adjacent to the inner side portion layer and defines the second main surface; and
a material composition of the outer side portion layer is different from a material composition of the inner side portion layer.

25. The laminated capacitor according to claim 22, wherein
at least each of the first and second outer electrodes includes a base portion directly covering a surface of the multilayer body, and a cover portion which covers the base portion;
the base portion is made of a material including a ceramic component and a Ni component;
the cover portion is made of a plating film; and
each of the plurality of conductor layers is made of a material containing a Ni component.

26. The laminated capacitor according to claim 25, wherein the Ni component of each of the plurality of conductor layers and the Ni component of the base portion are integrated with each other in a connecting portion between each of the plurality of conductor layers and the base portion.

27. The laminated capacitor according to claim 22, wherein a distance between two ends of the plurality of conductor layers that are farthest from each other in the width direction is shorter than a distance between two ends of the plurality of conductor layers that are farthest from each other in the lengthwise direction.

28. The laminated capacitor according to claim 22, wherein
the side surfaces include a first side surface and a second side surface that oppose each other in the width direction;
the end surfaces include a first end surface and a second end surface that oppose each other in the lengthwise direction;
the side portions include a first side portion between the first side surface and the main portion, and a second side portion between the second side surface and the main portion;
the end portions include a first end portion between the first end surface and the main portion, and a second end portion between the second end surface and the main portion;
the width GW is a width of the first side portion or a width of the second side portion; and
the length GL is a length of the first end portion or a length of the second end portion.

* * * * *